US012779548B2

(12) United States Patent
Hirotsu et al.

(10) Patent No.: US 12,779,548 B2
(45) Date of Patent: Nov. 3, 2026

(54) CUTTING INSERT

(71) Applicant: Sumitomo Electric Hardmetal Corp., Itami (JP)

(72) Inventors: Yuki Hirotsu, Itami (JP); Hideo Maeno, Itami (JP); Junya Okida, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 196 days.

(21) Appl. No.: 18/853,730

(22) PCT Filed: Apr. 5, 2022

(86) PCT No.: PCT/JP2022/017097

§ 371 (c)(1),
(2) Date: Oct. 3, 2024

(87) PCT Pub. No.: WO2023/195070

PCT Pub. Date: Oct. 12, 2023

(65) Prior Publication Data

US 2025/0222527 A1 Jul. 10, 2025

(51) Int. Cl.

*B23B 27/14* (2006.01)
*B23B 27/16* (2006.01)

(52) U.S. Cl.

CPC .......... *B23B 27/143* (2013.01); *B23B 27/145* (2013.01); *B23B 27/1611* (2013.01); *B23B 2200/0414* (2013.01); *B23B 2200/0433* (2013.01); *B23B 2200/0452* (2013.01); *B23B 2200/321* (2013.01)

(58) Field of Classification Search

CPC . B23B 27/143; B23B 27/145; B23B 27/1611; B23B 2200/0414; B23B 2200/0452; B23B 2200/321

See application file for complete search history.

(56) References Cited

U.S. PATENT DOCUMENTS 4,318,645 A * 3/1982 McCreery ............ B23B 27/143 D15/139
4,359,300 A 11/1982 Hazra et al.

(Continued)

FOREIGN PATENT DOCUMENTS

EP 1967304 A2 * 9/2008 ........... B23B 27/143
JP 10-217007 A 8/1998

(Continued)

*Primary Examiner* — Jermie E Cozart
(74) *Attorney, Agent, or Firm* — XSENSUS LLP

(57) ABSTRACT

A cutting insert has a top surface, a bottom surface, and an outer peripheral surface. A ridgeline between the top surface and the outer peripheral surface includes a first cutting edge. A protrusion is provided on the top surface. In a first cross section, a distance between the first cutting edge and the protrusion in a direction perpendicular to the bottom surface is defined as a first distance. In a second cross section, a distance between the first cutting edge and the protrusion in a direction perpendicular to the bottom surface is defined as a third distance. The third distance is longer than the first distance. A ratio of a height of the protrusion to a width of the protrusion in the second cross section is smaller than a ratio of a height of the protrusion to a width of the protrusion in the first cross section.

4 Claims, 19 Drawing Sheets

(56) References Cited

U.S. PATENT DOCUMENTS

| | | | | |
|---|---|---|---|---|
| 2008/0008545 | A1 | 1/2008 | Rofner et al. | |
| 2012/0177452 | A1 * | 7/2012 | Konta | B23B 27/141 407/115 |
| 2013/0064613 | A1 * | 3/2013 | Krishtul | B23B 27/143 407/115 |
| 2015/0078844 | A1 * | 3/2015 | Majima | B23B 27/143 407/114 |
| 2015/0336175 | A1 * | 11/2015 | Krishtul | B23B 27/143 407/115 |
| 2015/0375303 | A1 * | 12/2015 | Fujii | B23B 27/143 407/66 |
| 2016/0228952 | A1 | 8/2016 | Kobayashi | |
| 2016/0243624 | A1 | 8/2016 | Tomoda et al. | |
| 2017/0297116 | A1 * | 10/2017 | Sakai | B23B 27/145 |
| 2021/0008637 | A1 | 1/2021 | Nagae | |
| 2021/0237167 | A1 | 8/2021 | Johansson et al. | |

FOREIGN PATENT DOCUMENTS

| | | | | |
|---|---|---|---|---|
| JP | 2017-104979 | A | 6/2017 | |
| JP | 2019-42817 | A | 3/2019 | |
| WO | WO-2010058856 | A1 * | 5/2010 | B23B 27/143 |
| WO | WO-2012067114 | A1 * | 5/2012 | B23B 27/1607 |
| WO | WO-2013129016 | A1 * | 9/2013 | B23B 27/143 |
| WO | 2015/046558 | A1 | 4/2015 | |
| WO | 2016/035490 | A1 | 3/2016 | |
| WO | 2019/189406 | A1 | 10/2019 | |

* cited by examiner

CUTTING INSERT

CROSS-REFERENCE TO RELATED APPLICATION

This application is a national stage application, pursuant to 35 U.S.C. § 371, of International Patent Application No. PCT/JP2022/017097, filed Apr. 5, 2022, the entire contents of which are incorporated herein by reference.

TECHNICAL FIELD

The present disclosure relates to a cutting insert.

BACKGROUND ART

WO2015/046558 (PTL 1) discloses a cutting insert. The cutting insert has an upper surface provided with a protrusion.

CITATION LIST

Patent Literature

PTL 1: WO 2015/046558

SUMMARY OF INVENTION

A cutting insert according to the present disclosure includes a top surface, a bottom surface, and an outer peripheral surface. The bottom surface is located opposite to the top surface. The outer peripheral surface is contiguous to each of the top surface and the bottom surface. A ridgeline between the top surface and the outer peripheral surface includes a first cutting edge, a corner cutting edge, and a second cutting edge. The corner cutting edge is contiguous to the first cutting edge. The second cutting edge is contiguous to the corner cutting edge. The second cutting edge is located opposite to the first cutting edge with respect to the corner cutting edge. A protrusion is provided on the top surface. When viewed in a first direction extending from the top surface to the bottom surface and perpendicular to the bottom surface, the protrusion extends along a bisector of an angle formed by the first cutting edge and the second cutting edge. In a cross section perpendicular to the bisector, the protrusion has a curved shape protruding outward. In the first direction, the protrusion is located closer to the bottom surface than each of the first cutting edge and the second cutting edge. When viewed in the first direction, a point of intersection of the corner cutting edge and the bisector is defined as a reference point. In a first cross section located at a distance of 0.5 mm from the reference point and perpendicular to the bisector, a distance between the first cutting edge and the protrusion in the first direction is defined as a first distance, and a distance between the second cutting edge and the protrusion in the first direction is defined as a second distance. In a second cross section located at a distance of 1.5 mm from the reference point and perpendicular to the bisector, a distance between the first cutting edge and the protrusion in the first direction is defined as a third distance, and a distance between the second cutting edge and the protrusion in the first direction is defined as a fourth distance. The third distance is longer than the first distance. The fourth distance is longer than the second distance. A ratio of a height of the protrusion to a width of the protrusion in the second cross section is smaller than a ratio of a height of the protrusion to a width of the protrusion in the first cross section.

DETAILED DESCRIPTION

Figure 1:
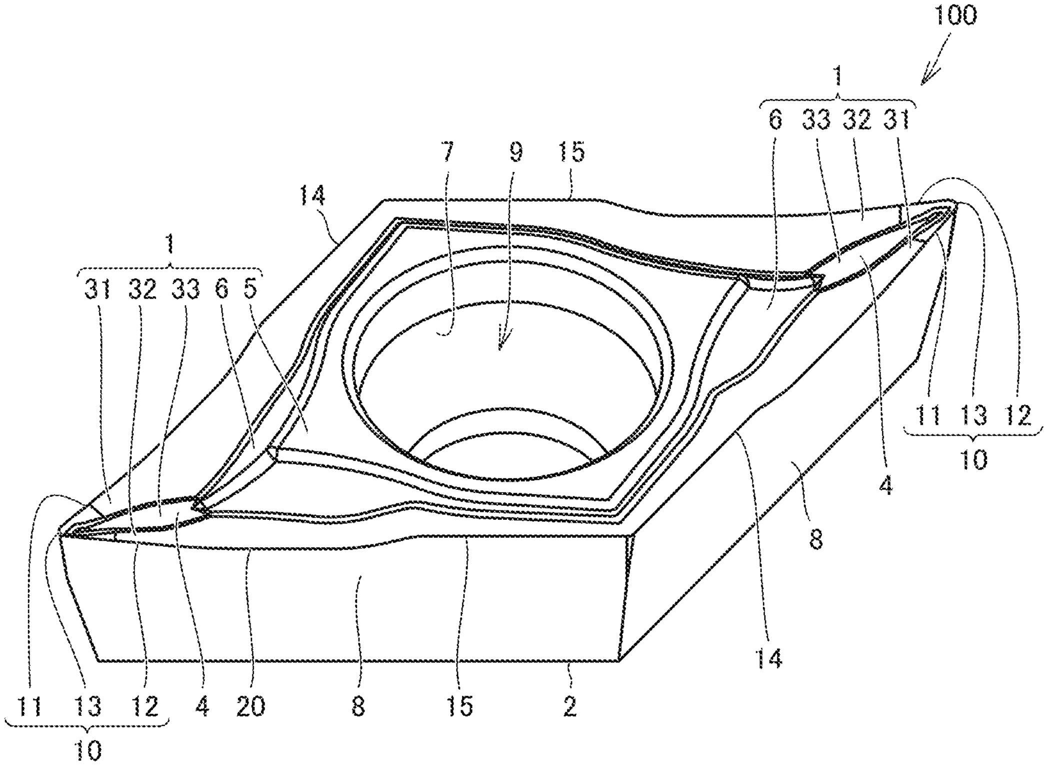
FIG. 1 is a schematic perspective view showing a configuration of a cutting insert according to a first embodiment.

Problem to be Solved by the Present Disclosure

An object of the present disclosure is to provide a cutting insert capable of improving the chip processability in a case of a small amount of cut and also capable of reducing the cutting resistance in a case of a large amount of cut.

Advantageous Effect of the Present Disclosure

According to the present disclosure, a cutting insert can be provide that is capable of improving the chip processability in a case of a small amount of cut and also capable of reducing the cutting resistance in a case of a large amount of cut.

DESCRIPTION OF EMBODIMENTS

First, an overview of an embodiment of the present disclosure will be described.

(1) A cutting insert 100 according to the present disclosure includes a top surface 1, a bottom surface 2, and an outer peripheral surface 8. Bottom surface 2 is located opposite to top surface 1. Outer peripheral surface 8 is contiguous to each of top surface 1 and bottom surface 2. A ridgeline 20 between top surface 1 and outer peripheral surface 8 includes a first cutting edge 11, a corner cutting edge 13, and a second cutting edge 12. Corner cutting edge 13 is contiguous to first cutting edge 11. Second cutting edge 12 is contiguous to corner cutting edge 13. Second cutting edge 12 is located opposite to first cutting edge 11 with respect to corner cutting edge 13. A protrusion 4 is provided on top surface 1. When viewed in a first direction 101 extending from top surface 1 to bottom surface 2 and perpendicular to bottom surface 2, protrusion 4 extends along a bisector 99 of an angle formed by first cutting edge 11 and second cutting edge 12. In a cross section perpendicular to bisector 99, protrusion 4 has a curved shape protruding outward. In first direction 101, protrusion 4 is located closer to bottom surface 2 than each of first cutting edge 11 and second cutting edge 12. When viewed in first direction 101, a point of intersection of corner cutting edge 13 and bisector 99 is defined as a reference point 98. In a first cross section CS1 located at a distance of 0.5 mm from reference point 98 and perpendicular to bisector 99, a distance between first cutting edge 11 and protrusion 4 in first direction 101 is defined as a first distance D1, and a distance between second cutting edge 12 and protrusion 4 in first direction 101 is defined as a second distance D2. In a second cross section CS2 located at a distance of 1.5 mm from reference point 98 and perpendicular to bisector 99, a distance between first cutting edge 11 and protrusion 4 in first direction 101 is defined as a third distance D3, and a distance between second cutting edge 12 and protrusion 4 in first direction 101 is defined as a fourth distance D4. Third distance D3 is longer than first distance D1. Fourth distance D4 is longer than second distance D2. A ratio of a height (a fourth height H4) of protrusion 4 to a width (a fourth width W4) of protrusion 4 in second cross section CS2 is smaller than a ratio of a height (a third height H3) of protrusion 4 to a width (a third width W3) of protrusion 4 in first cross section CS1.

(2) In cutting insert 100 according to (1), top surface 1 may have a first rake face 31 and a second rake face 32. First rake face 31 may be contiguous to first cutting edge 11. First rake face 31 may be located between first cutting edge 11 and protrusion 4. Second rake face 32 may be contiguous to second cutting edge 12. Second rake face 32 may be located between second cutting edge 12 and protrusion 4. A ratio of a height of first rake face 31 to a width of first rake face 31 in second cross section CS2 may be smaller than a ratio of a height (a first height H1) of first rake face 31 to a width (a first width W1) of first rake face 31 in first cross section CS1. A ratio of a height of second rake face 32 to a width of second rake face 32 in second cross section CS2 may be smaller than a ratio of a height (a second height H2) of second rake face 32 to a width (a second width W2) of second rake face 32 in first cross section CS1. In first cross section CS1, each of first rake face 31 and second rake face 32 may have a curved shape protruding outward. In first cross section CS1, a rake angle (a first rake angle θ11) of first rake face 31 may be larger in a direction closer to protrusion 4 from first cutting edge 11. In first cross section CS1, a rake angle (a second rake angle θ12) of second rake face 32 may be larger in a direction closer to protrusion 4 from second cutting edge 12.

(3) In cutting insert 100 according to (2), in second cross section CS2, each of first rake face 31 and second rake face 32 may be straight in shape.

(4) In cutting insert 100 according to (2) or (3), top surface 1 may further have a third rake face 33 and a corner rake face 34. Third rake face 33 may be located between first rake face 31 and second rake face 32. Third rake face 33 may be formed by protrusion 4. Corner rake face 34 may be located between third rake face 33 and corner cutting edge 13. Third rake face 33 may have a first surface 41 and a second surface 42. First surface 41 may be located opposite to corner cutting edge 13 with respect to corner rake face 34. Second surface 42 may be contiguous to first surface 41. Second surface 42 may be located opposite to corner rake face 34 with respect to first surface 41. In a cross section (a fourth cross section CS4) parallel to first direction 101 and including bisector 99, first surface 41 may be inclined with respect to corner rake face 34 in second direction 102 extending from bottom surface 2 to top surface 1. In the cross section (fourth cross section CS4) parallel to first direction 101 and including bisector 99, second surface 42 may be located closer to bottom surface 2 than first surface 41.

DETAILS OF EMBODIMENTS

Hereinafter, embodiments of the present disclosure will be described in detail. In the following description, the same or corresponding elements are denoted by the same reference characters, and the same description will not be repeated.

First Embodiment

First, a configuration of a cutting insert 100 according to the first embodiment will be described.

FIG. 1 is a schematic perspective view showing a configuration of cutting insert 100 according to the first embodiment. As shown in FIG. 1, cutting insert 100 mainly has a top surface 1, a bottom surface 2, an inner peripheral surface 7, and an outer peripheral surface 8. Bottom surface 2 is located opposite to top surface 1. Inner peripheral surface 7 is contiguous to each of top surface 1 and bottom surface 2. Inner peripheral surface 7 provides a through hole 9. Through hole 9 penetrates top surface 1 and bottom surface 2. Outer peripheral surface 8 is contiguous to each of top surface 1 and bottom surface 2. Outer peripheral surface 8 is located outside inner peripheral surface 7.

At least a part of a ridgeline 20 between top surface 1 and outer peripheral surface 8 serves as a cutting edge. Ridgeline 20 is annular in shape. Ridgeline 20 has a pair of cutting edge portions 10, a pair of first straight portions 14, and a pair of second straight portions 15. Along ridgeline 20, cutting edge portions 10, first straight portions 14, and second straight portions 15 are arranged in an alternate manner in the circumferential direction. In the present specification, the circumferential direction means the circumferential direction of ridgeline 20. The pair of cutting edge portions 10 are located opposite to each other with respect to through hole 9. In other words, through hole 9 is located between the pair of cutting edge portions 10. The pair of first straight portions 14 are located opposite to each other with respect to through hole 9. In other words, through hole 9 is located between the pair of first straight portions 14. The pair of second straight portions 15 are located opposite to each other with respect to through hole 9. In other words, through hole 9 is located between the pair of second straight portions 15.

Cutting edge portion 10 includes a first cutting edge 11, a corner cutting edge 13, and a second cutting edge 12. First cutting edge 11 is contiguous to first straight portion 14.

Corner cutting edge 13 is contiguous to first cutting edge 11. Corner cutting edge 13 is located opposite to first straight portion 14 with respect to first cutting edge 11. From a different point of view, first cutting edge 11 is located between first straight portion 14 and corner cutting edge 13 in the circumferential direction. Second cutting edge 12 is contiguous to corner cutting edge 13. Second cutting edge 12 is located opposite to first cutting edge 11 with respect to corner cutting edge 13. From a different point of view, in the circumferential direction, corner cutting edge 13 is located between first cutting edge 11 and second cutting edge 12. Second straight portion 15 is contiguous to second cutting edge 12. Second straight portion 15 is located opposite to corner cutting edge 13 with respect to second cutting edge 12. From a different point of view, in the circumferential direction, second cutting edge 12 is located between corner cutting edge 13 and second straight portion 15.

Top surface 1 has a first rake face 31, a second rake face 32, a third rake face 33, an upward slope surface 6, and a flat surface 5. First rake face 31 is contiguous to first cutting edge 11. Second rake face 32 is contiguous to second cutting edge 12. Third rake face 33 is located between first rake face 31 and second rake face 32. From a different point of view, first rake face 31 is located between first cutting edge 11 and third rake face 33. Second rake face 32 is located between second cutting edge 12 and third rake face 33.

Upward slope surface 6 is located at a distance from ridgeline 20. Flat surface 5 is located between upward slope surface 6 and inner peripheral surface 7. Upward slope surface 6 extends upward from each of first rake face 31, second rake face 32, and third rake face 33 toward flat surface 5.

A protrusion 4 is provided on top surface 1. Third rake face 33 is formed by protrusion 4. In other words, protrusion 4 is located between first rake face 31 and second rake face 32. From a different point of view, first rake face 31 is located between first cutting edge 11 and protrusion 4. Second rake face 32 is located between second cutting edge 12 and protrusion 4. Protrusion 4 is located between corner cutting edge 13 and upward slope surface 6.

Figure 2:
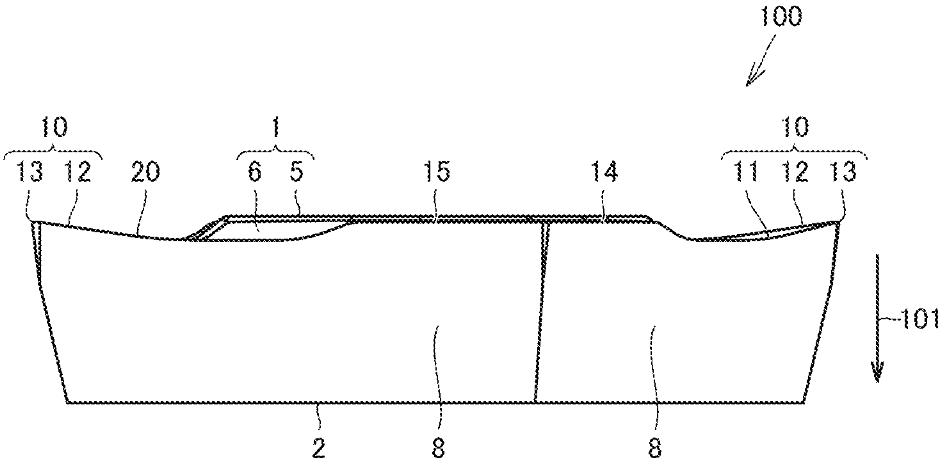
FIG. 2 is a schematic side view showing the configuration of the cutting insert according to the first embodiment.

FIG. 2 is a schematic side view showing the configuration of cutting insert 100 according to the first embodiment. As shown in FIG. 2, bottom surface 2 may have a flat plate shape. In the present specification, a direction from top surface 1 to bottom surface 2 is defined as a first direction 101. First direction 101 is perpendicular to bottom surface 2. Flat surface 5 of top surface 1 may have a flat plate shape. Flat surface 5 is substantially parallel to bottom surface 2. First cutting edge 11 is recessed in first direction 101. In other words, first cutting edge 11 has a curved shape protruding in first direction 101. Second cutting edge 12 is recessed in first direction 101. In other words, second cutting edge 12 has a curved shape protruding in first direction 101. First straight portion 14 is substantially parallel to bottom surface 2. Second straight portion 15 is substantially parallel to bottom surface 2. In first direction 101, ridgeline 20 is located between bottom surface 2 and flat surface 5.

Figure 3:
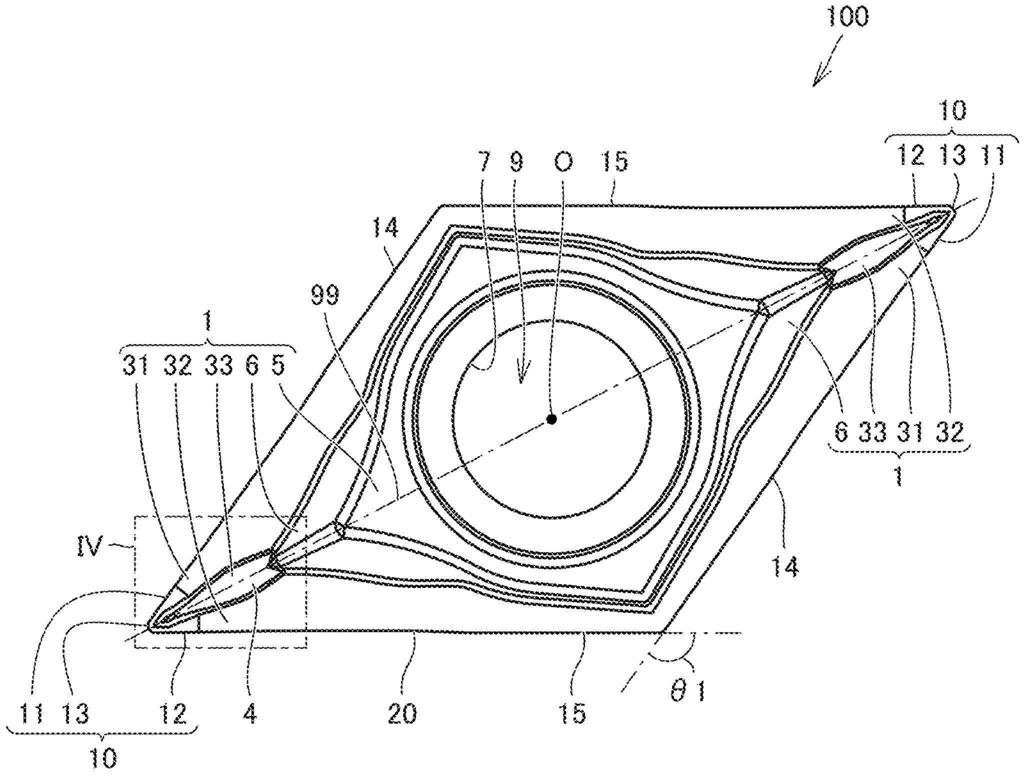
FIG. 3 is a schematic plan view showing the configuration of the cutting insert according to the first embodiment.

FIG. 3 is a schematic plan view showing the configuration of cutting insert 100 according to the first embodiment. As shown in FIG. 3, when viewed in first direction 101 (see FIG. 2), the center of inner peripheral surface 7 is defined as a center O. When viewed in first direction 101, a straight line dividing an angle formed by first cutting edge 11 and second cutting edge 12 into two equal parts is defined as a bisector 99. When viewed in first direction 101, bisector 99 passes through center O.

As shown in FIG. 3, ridgeline 20 is substantially parallelogram in shape when viewed in first direction 101. When viewed in first direction 101, the pair of first straight portions 14 may be substantially parallel to each other. The pair of second straight portions 15 may be substantially parallel to each other.

As shown in FIG. 3, when viewed in first direction 101, an acute angle is formed by first cutting edge 11 and second cutting edge 12. When viewed in first direction 101, an obtuse angle is formed by first straight portion 14 and second straight portion 15. When viewed in first direction 101, a first angle θ1 is formed by first straight portion 14 and second straight portion 15. First angle θ1 is, for example, 125°. First angle θ1 may be, for example, 120° or more and 130° or less.

As shown in FIG. 3, when viewed in first direction 101, the shape of top surface 1 is substantially line-symmetric with respect to bisector 99. From a different point of view, when viewed in first direction 101, the shape of ridgeline 20 is substantially line-symmetric with respect to bisector 99. When viewed in first direction 101, the shape of top surface 1 is substantially twofold symmetric with respect to center O. From a different point of view, the shape of ridgeline 20 is substantially twofold symmetric with respect to center O when viewed in first direction 101.

When viewed in first direction 101, protrusion 4 extends along bisector 99. When viewed in first direction 101, bisector 99 is located between first rake face 31 and second rake face 32. When viewed in first direction 101, bisector 99 intersects with each of the pair of corner cutting edges 13.

Figure 4:
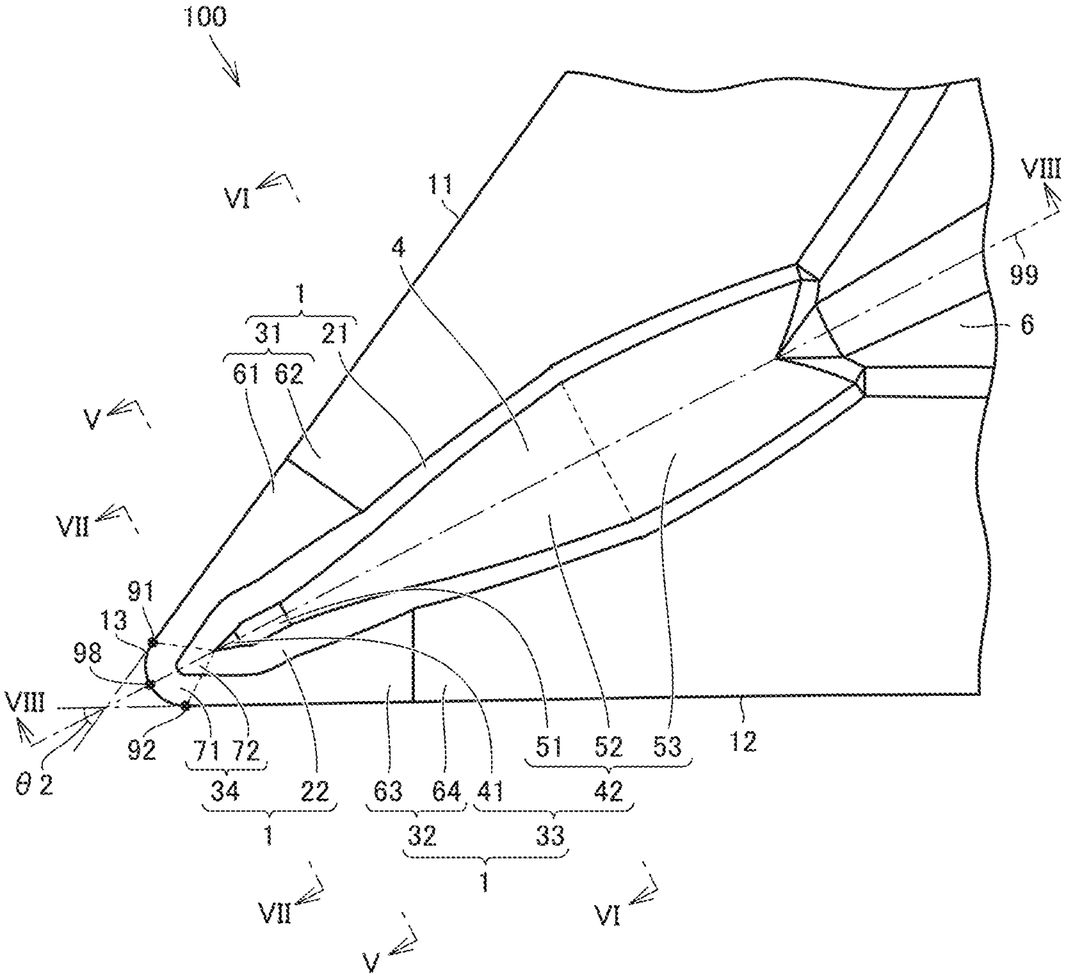
FIG. 4 is an enlarged schematic view showing a region IV in FIG. 3.

FIG. 4 is an enlarged schematic view showing a region IV in FIG. 3. As shown in FIG. 4, one end of corner cutting edge 13 is defined as a first end portion 91. In corner cutting edge 13, an end portion opposite to first end portion 91 is defined as a second end portion 92. At first end portion 91, corner cutting edge 13 is contiguous to first cutting edge 11. At second end portion 92, corner cutting edge 13 is contiguous to second cutting edge 12. When viewed in first direction 101, a point of intersection of corner cutting edge 13 and bisector 99 is defined as a reference point 98. When viewed in first direction 101, each of first cutting edge 11 and second cutting edge 12 is straight in shape. When viewed in first direction 101, corner cutting edge 13 has an arc shape.

As shown in FIG. 4, when viewed in first direction 101, second cutting edge 12 is inclined with respect to first cutting edge 11. When viewed in first direction 101, a second angle θ2 is formed by first cutting edge 11 and second cutting edge 12. Second angle θ2 is, for example, 55°. Second angle θ2 may be, for example, 50° or more and 60° or less.

As shown in FIG. 4, top surface 1 further includes a corner rake face 34, a first intermediate rake face 21, and a second intermediate rake face 22. Corner rake face 34 is located between third rake face 33 and corner cutting edge 13. Corner rake face 34 is contiguous to each of corner cutting edge 13, first rake face 31, second rake face 32, and third rake face 33.

First intermediate rake face 21 is located between first rake face 31 and third rake face 33. First intermediate rake face 21 is contiguous to each of first rake face 31, third rake face 33, and corner rake face 34.

Second intermediate rake face 22 is located between second rake face 32 and third rake face 33. Second intermediate rake face 22 is contiguous to each of second rake face 32, third rake face 33, and corner rake face 34. Second intermediate rake face 22 is located opposite to first intermediate rake face 21 with respect to third rake face 33. From a different point of view, third rake face 33 is located between first intermediate rake face 21 and second intermediate rake face 22.

Corner rake face 34 is formed by a first corner rake portion 71 and a second corner rake portion 72. First corner rake portion 71 is contiguous to each of corner cutting edge 13, first rake face 31, and second rake face 32.

Second corner rake portion 72 is located opposite to corner cutting edge 13 with respect to first corner rake portion 71. From a different point of view, first corner rake portion 71 is located between corner cutting edge 13 and second corner rake portion 72. Second corner rake portion 72 is located between first corner rake portion 71 and third rake face 33. Second corner rake portion 72 is contiguous to each of first corner rake portion 71, first intermediate rake face 21, second intermediate rake face 22, and third rake face 33.

First rake face 31 is formed by a first rake portion 61 and a second rake portion 62. First rake portion 61 is contiguous to each of first cutting edge 11, first corner rake portion 71, and first intermediate rake face 21.

Second rake portion 62 is located opposite to first corner rake portion 71 with respect to first rake portion 61. From a different point of view, first rake portion 61 is located between first corner rake portion 71 and second rake portion 62. Second rake portion 62 is contiguous to each of first cutting edge 11, first rake portion 61, and first intermediate rake face 21.

Second rake face 32 is formed by a third rake portion 63 and a fourth rake portion 64. Third rake portion 63 is contiguous to each of second cutting edge 12, first corner rake portion 71, and second intermediate rake face 22. Fourth rake portion 64 is located opposite to first corner rake portion 71 with respect to third rake portion 63. From a different point of view, third rake portion 63 is located between first corner rake portion 71 and fourth rake portion 64. Fourth rake portion 64 is contiguous to each of second cutting edge 12, third rake portion 63, and second intermediate rake face 22.

Third rake face 33 has a first surface 41 and a second surface 42. First surface 41 is located opposite to corner cutting edge 13 with respect to corner rake face 34. From a different point of view, corner rake face 34 is located between corner cutting edge 13 and first surface 41. First surface 41 is contiguous to each of corner rake face 34, first intermediate rake face 21, and second intermediate rake face 22. When viewed in first direction 101, first surface 41 extends along bisector 99. When viewed in first direction 101, the width of first surface 41 in the direction perpendicular to bisector 99 may be larger in a direction farther away from reference point 98.

Second surface 42 is located opposite to corner rake face 34 with respect to first surface 41. From a different point of view, first surface 41 is located between corner rake face 34 and second surface 42. Second surface 42 is contiguous to each of first surface 41, first intermediate rake face 21, and second intermediate rake face 22. When viewed in first direction 101, second surface 42 extends along bisector 99.

Second surface 42 is formed by a first portion 51, a second portion 52, and a third portion 53. First portion 51 is located opposite to corner rake face 34 with respect to first surface 41. From a different point of view, first surface 41 is located between corner rake face 34 and first portion 51. First portion 51 is contiguous to each of first surface 41, first intermediate rake face 21, and second intermediate rake face 22. When viewed in first direction 101, first portion 51 extends along bisector 99. When viewed in first direction 101, the width of first portion 51 in the direction perpendicular to bisector 99 may be substantially the same over the entire surface of first portion 51.

Second portion 52 is located opposite to first surface 41 with respect to first portion 51. From a different point of view, first portion 51 is located between first surface 41 and second portion 52. Second portion 52 is contiguous to each of first portion 51, first intermediate rake face 21, and second intermediate rake face 22. When viewed in first direction 101, second portion 52 extends along bisector 99. When viewed in first direction 101, the width of second portion 52 in the direction perpendicular to bisector 99 may be larger in a direction farther away from reference point 98.

Third portion 53 is located opposite to first portion 51 with respect to second portion 52. From a different point of view, second portion 52 is located between first portion 51 and third portion 53. Third portion 53 is contiguous to each of second portion 52, first intermediate rake face 21, and second intermediate rake face 22. When viewed in first direction 101, third portion 53 extends along bisector 99. When viewed in first direction 101, the width of third portion 53 in the direction perpendicular to bisector 99 may be smaller in a direction farther away from reference point 98.

Figure 5:
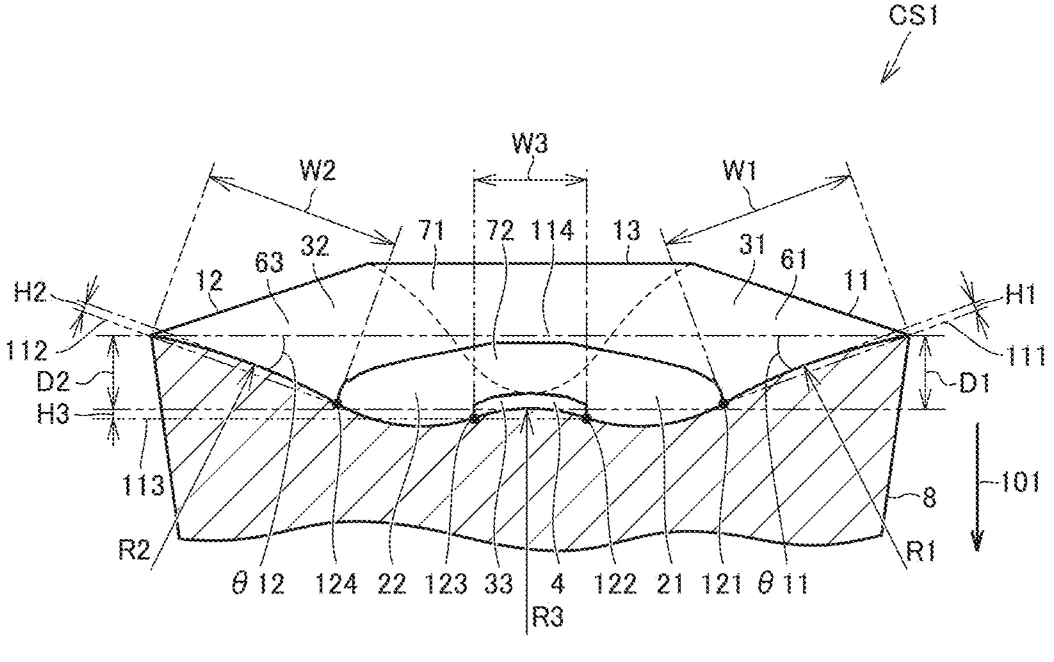
FIG. 5 is a schematic vertical cross-sectional view taken along a line V-V in FIG. 4.

FIG. 5 is a schematic vertical cross-sectional view taken along a line V-V in FIG. 4. The cross section shown in FIG. 5 is located at a distance of 0.5 mm from reference point 98 and is perpendicular to bisector 99. The cross section shown in FIG. 5 is defined as a first cross section CS1.

In a cross section perpendicular to bisector 99, a straight line passing through both ends of first rake face 31 is defined as a first imaginary straight line 111. In the cross section perpendicular to bisector 99, a straight line passing through both ends of second rake face 32 is defined as a second imaginary straight line 112. In the cross section perpendicular to bisector 99, a straight line passing through both ends of protrusion 4 is defined as a third imaginary straight line 113.

In the present specification, the distance between both ends of a plane in the cross section perpendicular to bisector 99 is defined as a width of this plane. Specifically, for example, the distance between both ends of first rake face 31 in the cross section perpendicular to bisector 99 is defined as a width of first rake face 31. The distance between both ends of protrusion 4 in the cross section perpendicular to bisector 99 is defined as a width of protrusion 4.

In the present specification, the maximum distance between a straight line passing through both ends of a plane in the cross section perpendicular to bisector 99 and this plane is defined as a height of this plane. Specifically, the distance between first imaginary straight line 111 and a point on first rake face 31 that is farthest from first imaginary straight line 111 in the cross section perpendicular to bisector 99 is defined as a height of first rake face 31. In the cross section perpendicular to bisector 99, the distance between third imaginary straight line 113 and a point on protrusion 4 that is farthest from third imaginary straight line 113 is defined as a height of protrusion 4.

A straight line parallel to bottom surface 2 (see FIG. 2) and perpendicular to bisector 99 (see FIG. 4) is defined as a fourth imaginary straight line 114. In the cross section perpendicular to bisector 99, an angle formed by fourth imaginary straight line 114 and first rake face 31 is defined as a first rake angle θ11. Specifically, first rake angle θ11 is formed by fourth imaginary straight line 114 and a tangent to first rake face 31. In other words, first rake angle θ11 is a rake angle of first rake face 31.

In the cross section perpendicular to bisector 99, a second rake angle θ12 is formed by fourth imaginary straight line 114 and second rake face 32. Specifically, second rake angle θ12 is formed by fourth imaginary straight line 114 and a tangent to second rake face 32. In other words, second rake angle θ12 is a rake angle of second rake face 32.

As shown in FIG. 5, in first cross section CS1, first rake face 31 is smoothly contiguous to first intermediate rake face 21 at a first connection point 121. From a different point of view, in first cross section CS1, the slope of the tangent to first rake face 31 and the slope of the tangent to first intermediate rake face 21 continuously change at first connection point 121. In first cross section CS1, first intermediate rake face 21 is smoothly contiguous to protrusion 4 at a second connection point 122. From a different point of view, in first cross section CS1, the slope of the tangent to first intermediate rake face 21 and the slope of the tangent to protrusion 4 continuously change at second connection point 122.

Protrusion 4 is smoothly contiguous to second intermediate rake face 22 at a third connection point 123. From a different point of view, in first cross section CS1, the slope of the tangent to protrusion 4 and the slope of the tangent to second intermediate rake face 22 continuously change at third connection point 123. Second intermediate rake face 22 is smoothly contiguous to second rake face 32 at a fourth connection point 124. From a different point of view, in first cross section CS1, the slope of the tangent to second intermediate rake face 22 and the slope of the tangent to second rake face 32 continuously change at fourth connection point 124. Each of first connection point 121, second connection point 122, third connection point 123, and fourth connection point 124 is a point of inflection.

As shown in FIG. 5, in first cross section CS1, first imaginary straight line 111 passes through first connection point 121 and a point of contact between first rake face 31 and first cutting edge 11. In first cross section CS1, second imaginary straight line 112 passes through fourth connection point 124 and a point of contact between second rake face 32 and second cutting edge 12. In first cross section CS1, third imaginary straight line 113 passes through second connection point 122 and third connection point 123.

As shown in FIG. 5, in first cross section CS1, each of first rake portion 61 and third rake portion 63 has a curved shape protruding outward. In other words, in first cross section CS1, each of first rake face 31 and second rake face 32 has a curved shape protruding outward. In first cross section CS1, each of first rake portion 61 and third rake portion 63 may have an arc shape substantially protruding outward. In other words, in first cross section CS1, each of first rake face 31 and second rake face 32 may have an arc shape substantially protruding outward.

The radius of curvature of first rake face 31 in first cross section CS1 is defined as a first radius of curvature R1. First radius of curvature R1 is, for example, 0.65 mm. First radius of curvature R1 may be, for example, 0.30 mm or more and 2.00 mm or less.

The radius of curvature of second rake face 32 in first cross section CS1 is defined as a second radius of curvature R2. Second radius of curvature R2 may be substantially equal to first radius of curvature R1. Second radius of curvature R2 is, for example, 0.65 mm. Second radius of curvature R2 may be, for example, 0.30 mm or more and 2.00 mm or less.

The width of first rake face 31 in first cross section CS1 is defined as a first width W1. In other words, first width W1 denotes a distance from first connection point 121 to the point of contact between first rake face 31 and first cutting edge 11 in first cross section CS1. The height of first rake face 31 in first cross section CS1 is defined as a first height H1. The ratio of first height H1 to first width W1 is defined as a first ratio. The first ratio is, for example, 0.036. The first ratio may be, for example, 0.005 or more and 0.100 or less. The lower limit of the first ratio is not particularly limited but, for example, may be 0.010 or more or may be 0.020 or more. The upper limit of the first ratio is not particularly limited but, for example, may be 0.080 or less or may be 0.060 or less.

The width of second rake face 32 in first cross section CS1 is defined as a second width W2. In other words, second width W2 denotes a distance from fourth connection point 124 to a point of contact between second rake face 32 and second cutting edge 12 in first cross section CS1. The height of second rake face 32 in first cross section CS1 is defined as a second height H2. The ratio of second height H2 to second width W2 is defined as a second ratio. The second ratio may be substantially equal to the first ratio. The second ratio is, for example, 0.036. The second ratio may be, for example, 0.005 or more and 0.100 or less. The lower limit of the second ratio is not particularly limited but, for example, may be 0.010 or more or may be 0.020 or more. The upper limit of the second ratio is not particularly limited but, for example, may be 0.080 or less or may be 0.060 or less.

In first cross section CS1, first rake angle θ11 is larger in a direction closer to protrusion 4 from first cutting edge 11. In first cross section CS1, first rake angle θ11 at the point of contact between first rake face 31 and first cutting edge 11 is, for example, 12°. In first cross section CS1, first rake angle θ11 at the point of contact between first rake face 31 and first cutting edge 11 may be, for example, 10° or more and 20° or less. In first cross section CS1, first rake angle θ11 at first connection point 121 is, for example, 28°. In first cross section CS1, first rake angle θ11 at first connection point 121 may be, for example, 20° or more and 40° or less.

In first cross section CS1, second rake angle θ12 is larger in a direction closer to protrusion 4 from second cutting edge 12. In first cross section CS1, second rake angle θ12 at the point of contact between second rake face 32 and second cutting edge 12 is, for example, 12°. In first cross section CS1, second rake angle θ12 at the point of contact between second rake face 32 and second cutting edge 12 may be, for example, 10° or more and 20° or less. In first cross section CS1, second rake angle θ12 at fourth connection point 124 is, for example, 28°. In first cross section CS1, second rake angle θ12 at fourth connection point 124 may be, for example, 20° or more and 40° or less.

As shown in FIG. 5, in first cross section CS1, protrusion 4 has a curved shape protruding outward. In first cross section CS1, protrusion 4 may have an arc shape substantially protruding outward. The radius of curvature of protrusion 4 in first cross section CS1 is defined as a third radius of curvature R3. Third radius of curvature R3 is, for example, 0.16 mm. Third radius of curvature R3 may be, for example, 0.10 mm or more and 0.30 mm or less.

The width of protrusion 4 in first cross section CS1 is defined as a third width W3. Specifically, third width W3 denotes a distance between second connection point 122 and third connection point 123. Third width W3 is, for example, 0.1 mm. Third width W3 may be, for example, 0.05 mm or more and 0.15 mm or less.

The height of protrusion 4 in first cross section CS1 is defined as a third height H3. The ratio of third height H3 to third width W3 is defined as a third ratio. The third ratio is, for example, 0.084. The third ratio may be, for example, 0.030 or more and 0.140 or less. The lower limit of the third ratio is not particularly limited but, for example, may be 0.045 or more or may be 0.060 or more. The upper limit of the third ratio is not particularly limited but, for example, may be 0.120 or less or may be 0.100 or less.

As shown in FIG. 5, protrusion 4 is located close to bottom surface 2 (see FIG. 2) with respect to each of first cutting edge 11 and second cutting edge 12. In first cross section CS1, the distance between first cutting edge 11 and protrusion 4 in first direction 101 is defined as a first distance D1. First distance D1 is, for example, 0.070 mm. First distance D1 may be, for example, 0.020 mm or more and 0.140 mm or less. The lower limit of first distance D1 is not particularly limited but, for example, may be 0.035 mm or more or may be 0.050 mm or more. The upper limit of first distance D1 is not particularly limited but, for example, may be 0.120 mm or less or may be 0.100 mm or less.

In first cross section CS1, the distance between second cutting edge 12 and protrusion 4 in first direction 101 is defined as a second distance D2. First distance D1 and second distance D2 may be substantially equal. Second distance D2 is, for example, 0.070 mm. Second distance D2 may be, for example, 0.020 mm or more and 0.140 mm or less. The lower limit of second distance D2 is not particularly limited but, for example, may be 0.035 mm or more or may be 0.050 mm or more. The upper limit of second distance D2 is not particularly limited but, for example, may be 0.120 mm or less or may be 0.100 mm or less.

As shown in FIG. 5, in first cross section CS1, first intermediate rake face 21 is recessed. In other words, in first cross section CS1, first intermediate rake face 21 has a curved shape protruding inward. In first cross section CS1, the width of first intermediate rake face 21 may be larger than third width W3. In other words, in first cross section CS1, the distance between first connection point 121 and second connection point 122 may be larger than third width W3.

As shown in FIG. 5, in first cross section CS1, second intermediate rake face 22 is recessed. In other words, in first cross section CS1, second intermediate rake face 22 has a curved shape protruding inward. In first cross section CS1, the width of second intermediate rake face 22 may be larger than third width W3. In other words, in first cross section CS1, the distance between third connection point 123 and fourth connection point 124 may be larger than third width W3.

As shown in FIG. 5, corner cutting edge 13 may be straight in shape when viewed in the direction along bisector 99. When viewed in the direction along bisector 99, corner cutting edge 13 may be parallel to bottom surface 2 (see FIG. 2).

Figure 6:
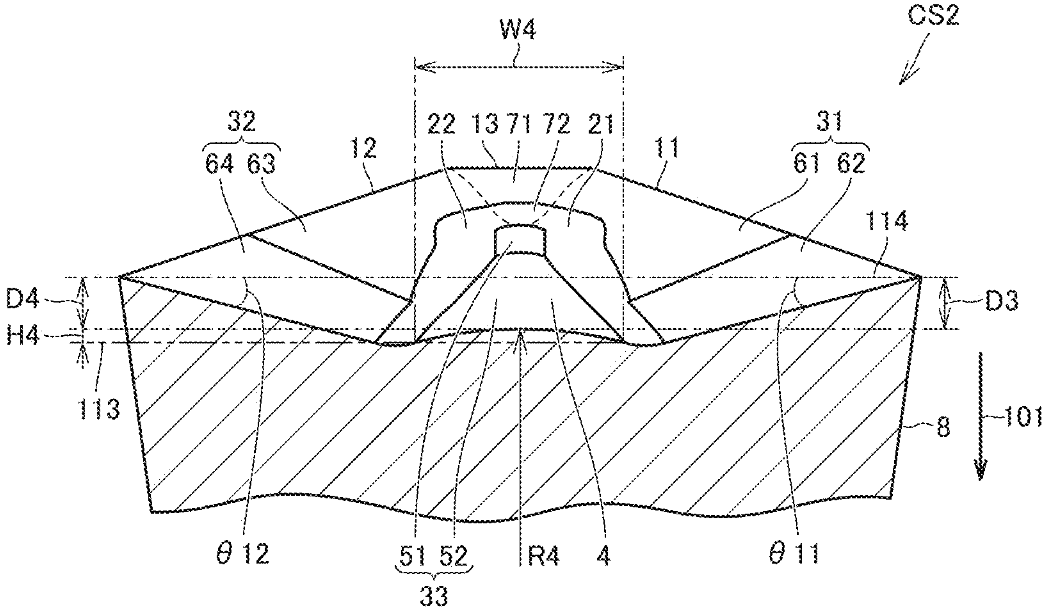
FIG. 6 is a schematic vertical cross-sectional view taken along a line VI-VI in FIG. 4.

FIG. 6 is a schematic vertical cross-sectional view taken along a line VI-VI in FIG. 4. The cross section shown in FIG. 6 is located at a distance of 1.5 mm from reference point 98 and is perpendicular to bisector 99. The cross section shown in FIG. 6 is defined as a second cross section CS2.

As shown in FIG. 6, in second cross section CS2, each of second rake portion 62 of first rake face 31 and fourth rake portion 64 of second rake face 32 is straight in shape. In other words, in second cross section CS2, each of first rake face 31 and second rake face 32 is straight in shape. From a different point of view, in second cross section CS2, the radius of curvature of each of first rake face 31 and second rake face 32 is infinite.

The ratio of the height of first rake face 31 to the width of first rake face 31 in second cross section CS2 is smaller than the first ratio. Specifically, in second cross section CS2, the height of first rake face 31 is 0 mm. The ratio of the height of first rake face 31 to the width of first rake face 31 in second cross section CS2 is 0.

The ratio of the height of second rake face 32 to the width of second rake face 32 in second cross section CS2 is smaller than the second ratio. Specifically, in second cross section CS2, the height of second rake face 32 is 0 mm. The ratio of the height of second rake face 32 to the width of second rake face 32 in second cross section CS2 is 0.

In second cross section CS2, first rake angle θ11 is substantially the same over the entire surface of first rake face 31. In second cross section CS2, first rake angle θ11 is, for example, 20°. In second cross section CS2, first rake angle θ11 may be, for example, 15° or more and 25° or less.

In second cross section CS2, second rake angle θ12 is substantially the same over the entire surface of second rake face 32. In second cross section CS2, second rake angle θ12 is, for example, 20°. In second cross section CS2, second rake angle θ12 may be, for example, 15° or more and 25° or less.

In second cross section CS2, the distance between first cutting edge 11 and protrusion 4 in first direction 101 is defined as a third distance D3. Third distance D3 is longer than first distance D1. Third distance D3 is, for example, 0.11 mm. Third distance D3 may be, for example, 0.04 mm or more and 0.20 mm or less. The lower limit of third distance D3 is not particularly limited but, for example, may be 0.06 mm or more or may be 0.08 mm or more. The upper limit of third distance D3 is not particularly limited but, for example, may be 0.18 mm or less or may be 0.15 mm or less.

In second cross section CS2, the distance between second cutting edge 12 and protrusion 4 in first direction 101 is defined as a fourth distance D4. Fourth distance D4 is longer than second distance D2. Fourth distance D4 may be substantially equal to third distance D3. Fourth distance D4 is, for example, 0.11 mm. Fourth distance D4 may be, for example, 0.04 mm or more and 0.20 mm or less. The lower limit of fourth distance D4 is not particularly limited but, for example, may be 0.06 mm or more or may be 0.08 mm or more. The upper limit of fourth distance D4 is not particularly limited but, for example, may be 0.18 mm or less or may be 0.15 mm or less.

As shown in FIG. 6, in second cross section CS2, protrusion 4 has a curved shape protruding outward. In second cross section CS2, protrusion 4 may have an arc shape substantially protruding outward. The radius of curvature of protrusion 4 in second cross section CS2 is defined as a fourth radius of curvature R4. Fourth radius of curvature R4 is larger than third radius of curvature R3. Fourth radius of curvature R4 is, for example, 0.9 mm. Fourth radius of curvature R4 may be, for example, 0.5 mm or more and 4.0 mm or less.

The width of protrusion 4 in second cross section CS2 is defined as a fourth width W4. Fourth width W4 is larger than third width W3. Fourth width W4 is, for example, 0.45 mm. Fourth width W4 may be, for example, 0.20 mm or more and 0.80 mm or less. The ratio of third width W3 to fourth width W4 is, for example, 0.22. The ratio of third width W3 to fourth width W4 may be, for example, 0.10 or more and 0.50 or less.

The height of protrusion 4 in second cross section CS2 is defined as a fourth height H4. The ratio of fourth height H4 to fourth width W4 is defined as a fourth ratio. The fourth ratio is smaller than the third ratio. The fourth ratio is, for example, 0.064. The fourth ratio may be, for example, 0.005 or more and 0.130 or less. The lower limit of the fourth ratio is not particularly limited but, for example, may be 0.015 or more or may be 0.030 or more. The upper limit of the fourth ratio is not particularly limited but, for example, may be 0.110 or less or may be 0.09 or less.

As shown in FIG. 6, in second cross section CS2, the width of first intermediate rake face 21 may be smaller than fourth width W4. In second cross section CS2, the width of second intermediate rake face 22 may be smaller than fourth width W4.

Figure 7:
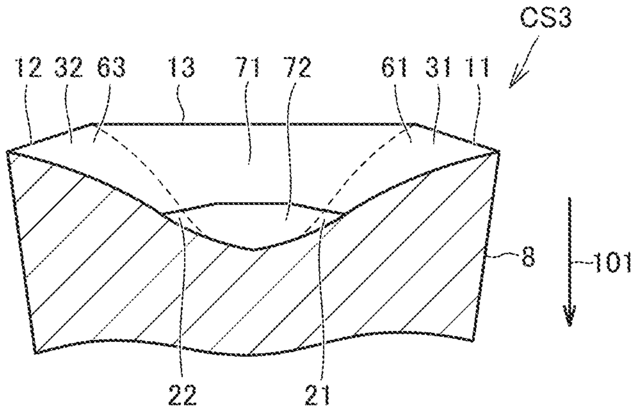
FIG. 7 is a schematic vertical cross-sectional view taken along a line VII-VII in FIG. 4.

FIG. 7 is a schematic vertical cross-sectional view taken along a line VII-VII in FIG. 4. The cross section shown in FIG. 7 is located at a distance of 0.25 mm from reference point 98 and is perpendicular to bisector 99. The cross section shown in FIG. 7 is defined as a third cross section CS3.

As shown in FIG. 7, third cross section CS3 does not intersect with protrusion 4 (see FIG. 4). From a different point of view, the distance between protrusion 4 and reference point 98 (see FIG. 4) is 0.25 mm or more. In third cross section CS3, first rake face 31 and second rake face 32 are contiguous to each other with an inwardly protruding curved line interposed therebetween. In third cross section CS3, second corner rake portion 72 is recessed. In other words, in third cross section CS3, second corner rake portion 72 has a curved shape protruding inward.

Figure 8:
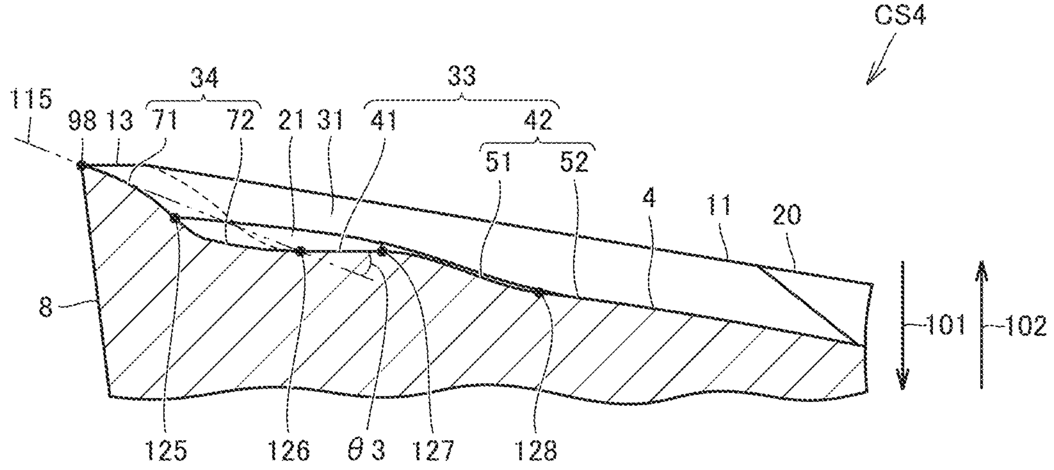
FIG. 8 is a schematic vertical cross-sectional view taken along a line VIII-VIII in FIG. 4.

FIG. 8 is a schematic vertical cross-sectional view taken along a line VIII-VIII in FIG. 4. The cross section shown in FIG. 8 is parallel to first direction 101 and includes bisector 99. The cross section shown in FIG. 8 is defined as a fourth cross section CS4. As shown in FIG. 8, first corner rake portion 71 is smoothly contiguous to second corner rake portion 72 at a fifth connection point 125. From a different point of view, in fourth cross section CS4, the slope of the tangent to first corner rake portion 71 and the slope of the tangent to second corner rake portion 72 continuously change at fifth connection point 125. Second corner rake portion 72 is smoothly contiguous to first surface 41 of third rake face 33 at a sixth connection point 126. From a different point of view, in fourth cross section CS4, the slope of the tangent to second corner rake portion 72 and the slope of the tangent to first surface 41 continuously change at sixth connection point 126.

First surface 41 is smoothly contiguous to first portion 51 of second surface 42 at a seventh connection point 127. From a different point of view, in fourth cross section CS4, the slope of the tangent to first surface 41 and the slope of the tangent to first portion 51 continuously change at seventh connection point 127. First portion 51 is smoothly contiguous to second portion 52 at an eighth connection point 128. From a different point of view, in fourth cross section CS4, the slope of the tangent to first portion 51 and the slope of the tangent to second portion 52 continuously change at eighth connection point 128. Each of fifth connection point 125, sixth connection point 126, seventh connection point 127, and eighth connection point 128 may be a point of inflection.

As shown in FIG. 8, in fourth cross section CS4, first corner rake portion 71 has a curved shape protruding outward. In fourth cross section CS4, second corner rake portion 72 is recessed. In other words, in fourth cross section CS4, second corner rake portion 72 has a curved shape protruding inward. In fourth cross section CS4, first surface 41 may be straight in shape. In fourth cross section CS4, first surface 41 may be substantially parallel to bottom surface 2 (see FIG. 2).

As shown in FIG. 8, in fourth cross section CS4, first portion 51 may have a curved shape. In fourth cross section CS4, first portion 51 may have a curved portion protruding outward and a curved portion protruding inward. In other words, in fourth cross section CS4, first portion 51 may have a point of inflection. In fourth cross section CS4, second portion 52 may have a curved shape protruding outward.

As shown in FIG. 8, in fourth cross section CS4, first surface 41 is inclined in a second direction 102 with respect to corner rake face 34. In other words, first surface 41 is inclined with respect to a fifth imaginary straight line 115 in a direction extending from bottom surface 2 to top surface 1. Second direction 102 extends from bottom surface 2 to top surface 1. Second direction 102 is, for example, perpendicular to bottom surface 2. Fifth imaginary straight line 115 passes through both ends of corner rake face 34 in fourth cross section CS4. From a different point of view, in fourth cross section CS4, fifth imaginary straight line 115 passes through sixth connection point 126 and a point of contact between corner cutting edge 13 and corner rake face 34. In other words, fifth imaginary straight line 115 passes through reference point 98 and sixth connection point 126. The inclination angle of first surface 41 with respect to fifth imaginary straight line 115 is defined as a third angle θ3. Third angle θ3 is, for example, 15°. Third angle θ3 may be, for example, 8° or more and 20° or less.

As shown in FIG. 8, in fourth cross section CS4, second surface 42 is located closer to bottom surface 2 than first surface 41. In fourth cross section CS4, second surface 42 is inclined in first direction 101 with respect to first surface 41. In other words, in fourth cross section CS4, second surface 42 is located closer to bottom surface 2 in a direction farther away from reference point 98. Each of corner rake face 34 and third rake face 33 is located closer to bottom surface 2 than ridgeline 20. In fourth cross section CS4, a boundary between first rake face 31 and first intermediate rake face 21 may intersect with second surface 42.

In first cross section CS1 (see FIG. 5), second cross section CS2 (see FIG. 6), and third cross section CS3 (see FIG. 7), each of first rake portion 61 and third rake portion 63 has a curved shape protruding outward. However, also in a cross section perpendicular to another bisector 99, each of first rake portion 61 and third rake portion 63 may have a curved shape protruding outward. In other words, in the cross section perpendicular to bisector 99, each of first rake portion 61 and third rake portion 63 may have a curved shape protruding outward, irrespective of the distance between reference point 98 and the cross section. In the cross section perpendicular to bisector 99, each of first rake portion 61 and third rake portion 63 may have an arc shape substantially protruding outward, irrespective of the distance between reference point 98 and the cross section. In a cross section perpendicular to bisector 99 and located in an area from reference point 98 to the boundary between protrusion 4 and upward slope surface 6, each of second rake portion 62 and fourth rake portion 64 may be straight in shape.

In the cross section perpendicular to bisector 99 and located in an area from reference point 98 to the boundary between protrusion 4 and upward slope surface 6, the radius of curvature of each of first rake face 31 and second rake face 32 may be larger in a direction farther away from reference point 98. In the cross section perpendicular to bisector 99 and located in an area from reference point 98 to the boundary between protrusion 4 and upward slope surface 6, the ratio of the height of first rake face 31 to the width of first rake face 31 may be smaller in a direction farther away from reference point 98. In the cross section perpendicular to bisector 99 and located in an area from reference point 98 to the boundary between protrusion 4 and upward slope surface 6, the ratio of the height of second rake face 32 to the width of second rake face 32 may be smaller in a direction farther away from reference point 98.

In a cross section perpendicular to bisector 99, protrusion 4 may have a curved shape protruding outward, irrespective of the distance between reference point 98 and the cross section.

The radius of curvature of protrusion 4 in the cross section perpendicular to bisector 99 may be larger in a direction farther away from reference point 98. The ratio of the height of protrusion 4 to the width of protrusion 4 in the cross section perpendicular to bisector 99 may be smaller in a direction farther away from reference point 98.

In the cross section perpendicular to bisector 99, the distance between first cutting edge 11 and protrusion 4 in first direction 101 may be longer in a direction farther away from reference point 98. In the cross section perpendicular to bisector 99, the distance between second cutting edge 12 and protrusion 4 in first direction 101 may be longer in a direction farther away from reference point 98.

In the cross section perpendicular to bisector 99 and located in an area from reference point 98 to the boundary between protrusion 4 and upward slope surface 6, first intermediate rake face 21 may be recessed. In other words, in the cross section perpendicular to bisector 99 and located in an area from reference point 98 to the boundary between protrusion 4 and upward slope surface 6, first intermediate rake face 21 may have a curved shape protruding inward.

In the cross section perpendicular to bisector 99 and located in an area from reference point 98 to the boundary between protrusion 4 and upward slope surface 6, second intermediate rake face 22 may be recessed. In other words, in the cross section perpendicular to bisector 99 and located in an area from reference point 98 to the boundary between protrusion 4 and upward slope surface 6, second intermediate rake face 22 may have a curved shape protruding inward.

Second Embodiment

The configuration of cutting insert 100 according to the second embodiment will be hereinafter described. Cutting insert 100 according to the second embodiment is different from cutting insert 100 according to the first embodiment in configuration, mainly in the angle formed by first cutting edge 11 and second cutting edge 12 when viewed in the first direction, but is substantially identical in configuration in other points to cutting insert 100 according to the first embodiment. The following mainly describes differences in configuration from cutting insert 100 according to the first embodiment.

Figure 9:
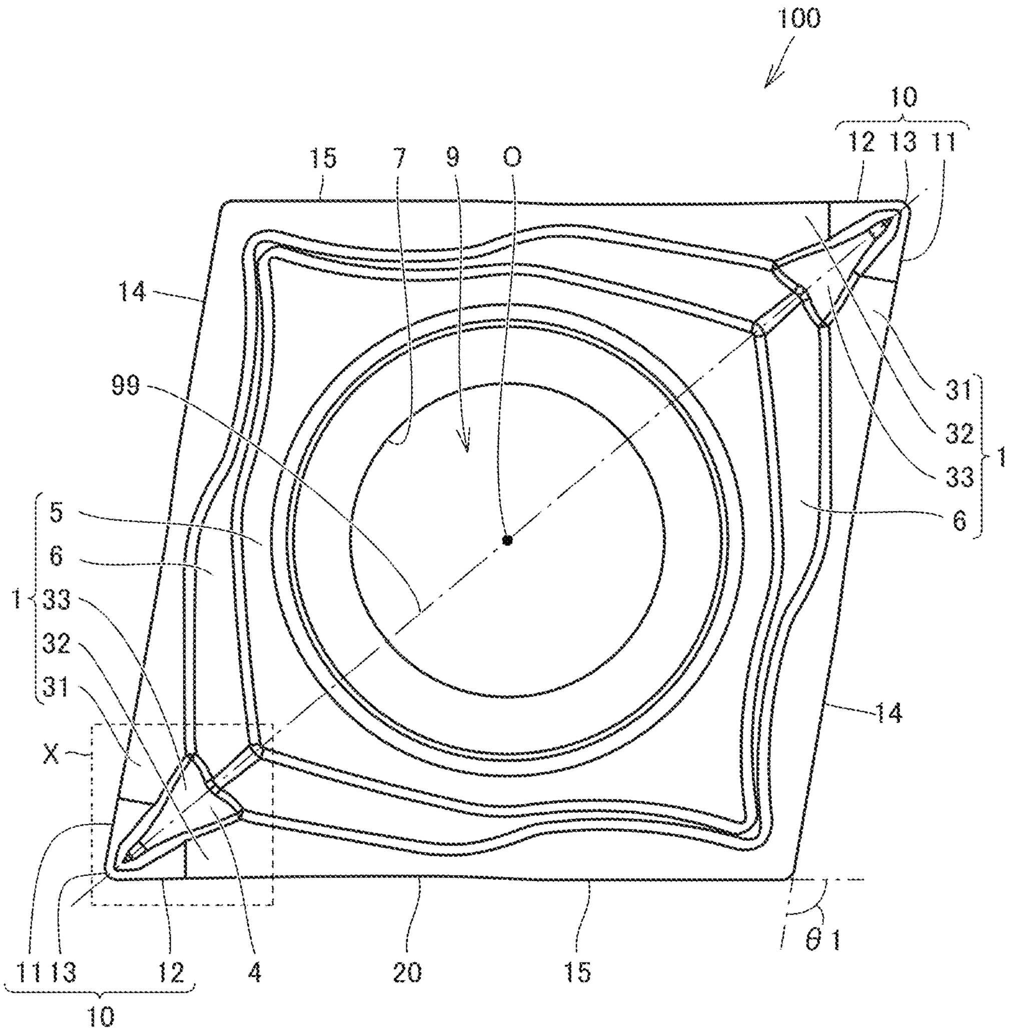
FIG. 9 is a schematic plan view showing a configuration of a cutting insert according to a second embodiment.

FIG. 9 is a schematic plan view showing a configuration of cutting insert 100 according to the second embodiment. When viewed in first direction 101, the angle (first angle θ1) formed by first straight portion 14 and second straight portion 15 is, for example, 100°. First angle θ1 may be, for example, 95° or more and 105° or less.

Figure 10:
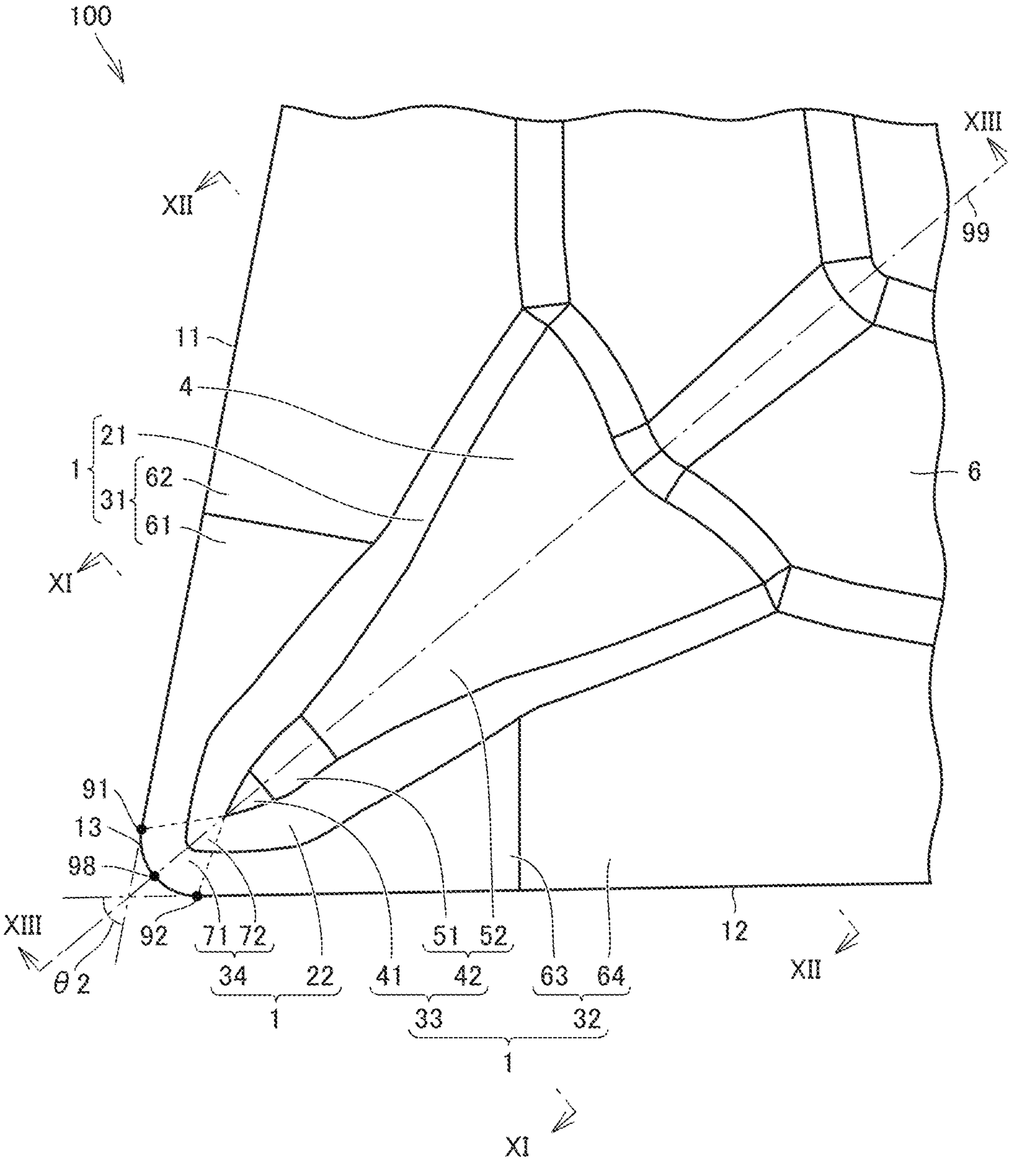
FIG. 10 is an enlarged schematic view showing a region X in FIG. 9.

FIG. 10 is an enlarged schematic view showing a region X in FIG. 9. As shown in FIG. 10, second surface 42 may be formed by first portion 51 and second portion 52. When viewed in first direction 101, the angle (second angle θ2) formed by first cutting edge 11 and second cutting edge 12 is, for example, 80°. Second angle θ2 may be, for example, 75° or more and 85° or less.

Figure 11:
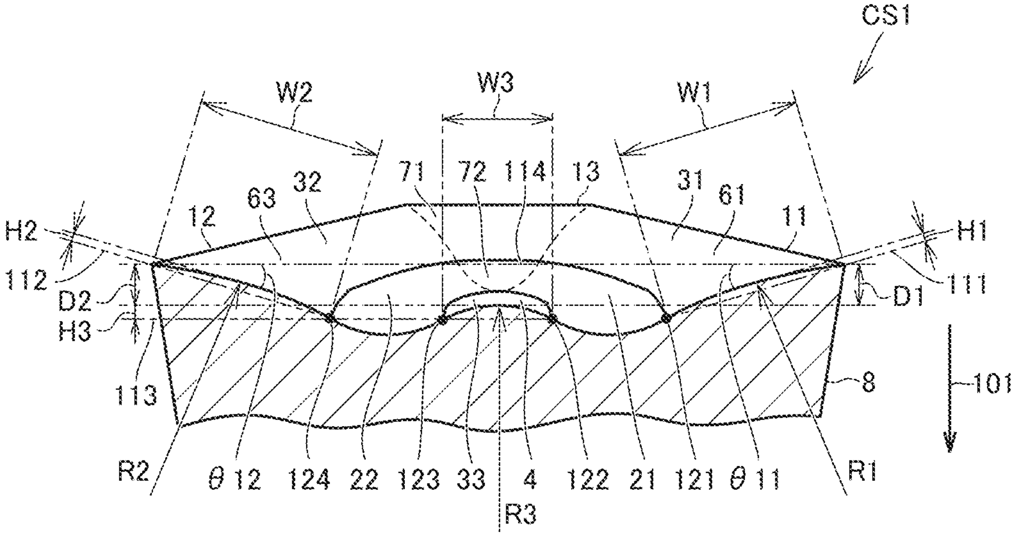
FIG. 11 is a schematic vertical cross-sectional view taken along a line XI-XI in FIG. 10.

FIG. 11 is a schematic vertical cross-sectional view taken along a line XI-XI in FIG. 10. Third width W3 of protrusion 4 is, for example, 0.16 mm. Third width W3 may be, for example, 0.10 mm or more and 0.20 mm or less. The third ratio of protrusion 4 is, for example, 0.14. The third ratio may be, for example, 0.10 or more and 0.20 or less.

Figure 12:
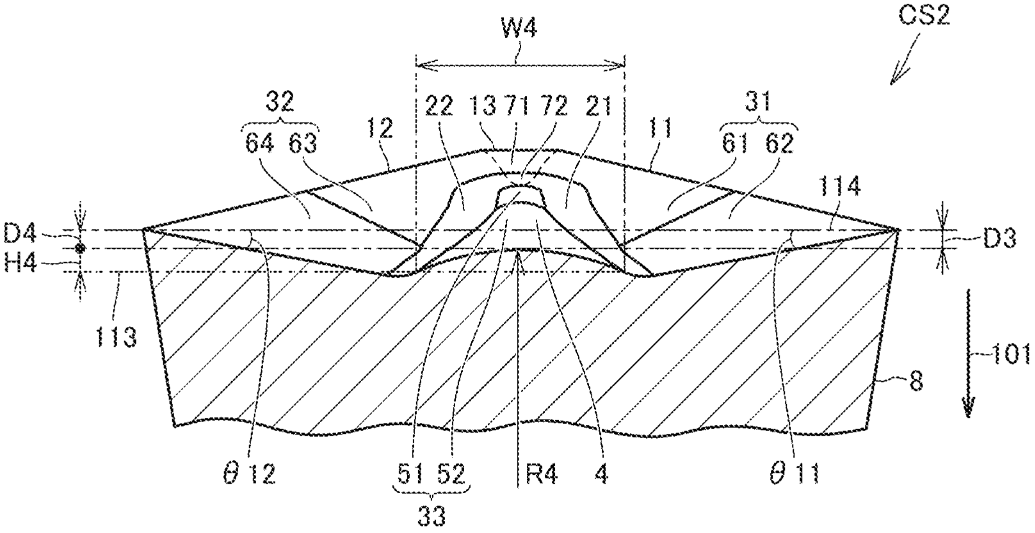
FIG. 12 is a schematic vertical cross-sectional view taken along a line XII-XII in FIG. 10.

FIG. 12 is a schematic vertical cross-sectional view taken along a line XII-XII in FIG. 10. Fourth width W4 of protrusion 4 is, for example, 0.71 mm. Fourth width W4 may be, for example, 0.30 mm or more and 2.00 mm or less. The ratio of third width W3 to fourth width W4 is, for example, 0.23. The ratio of third width W3 to fourth width W4 may be, for example, 0.05 or more and 0.5 or less. The fourth ratio of protrusion 4 is, for example, 0.10. The fourth ratio may be, for example, 0.01 or more and 0.18 or less.

Figure 13:
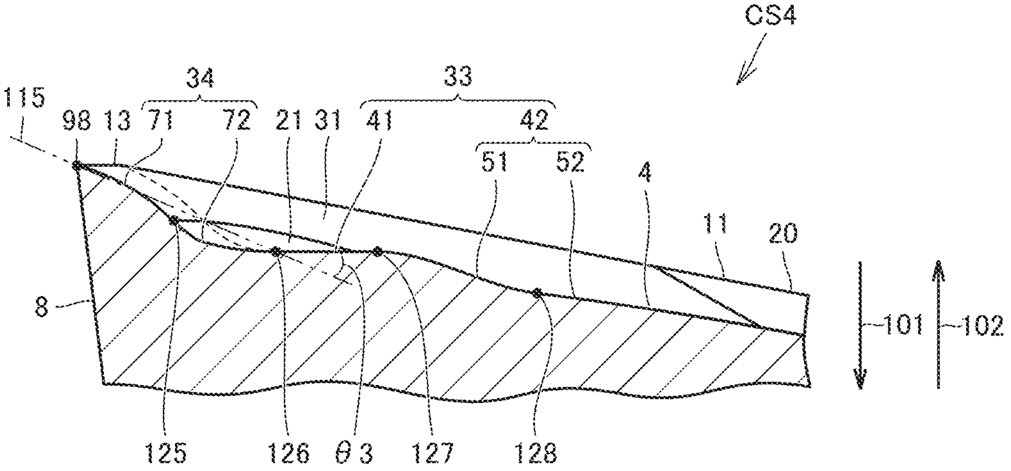
FIG. 13 is a schematic vertical cross-sectional view taken along a line XIII-XIII in FIG. 10.

FIG. 13 is a schematic vertical cross-sectional view taken along a line XIII-XIII in FIG. 10. In fourth cross section CS4, a boundary between first rake face 31 and first intermediate rake face 21 may intersect with first surface 41.

Third Embodiment

The configuration of cutting insert 100 according to the third embodiment will be hereinafter described. Cutting insert 100 according to the third embodiment is different from cutting insert 100 according to the first embodiment in configuration, mainly in the angle formed by first cutting edge 11 and second cutting edge 12 when viewed in the first direction, but is substantially identical in configuration in other points to cutting insert 100 according to the first embodiment. The following mainly describes differences in configuration from cutting insert 100 according to the first embodiment.

Figure 14:
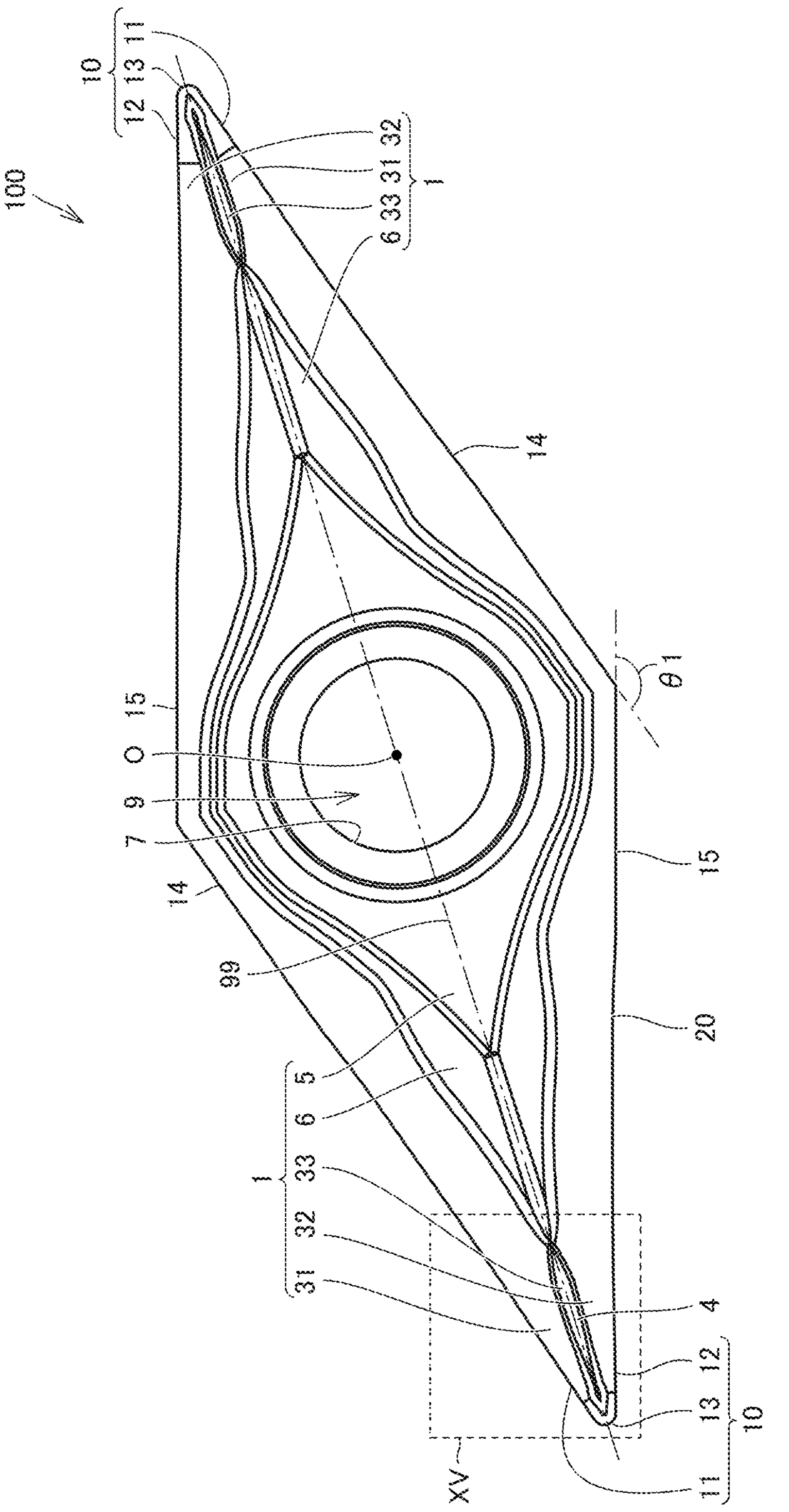
FIG. 14 is a schematic plan view showing a configuration of a cutting insert according to a third embodiment.

FIG. 14 is a schematic plan view showing a configuration of cutting insert 100 according to the third embodiment. When viewed in first direction 101, the angle (first angle θ1) formed by first straight portion 14 and second straight portion 15 is, for example, 145°. First angle θ1 may be, for example, 140° or more and 150° or less.

Figure 15:
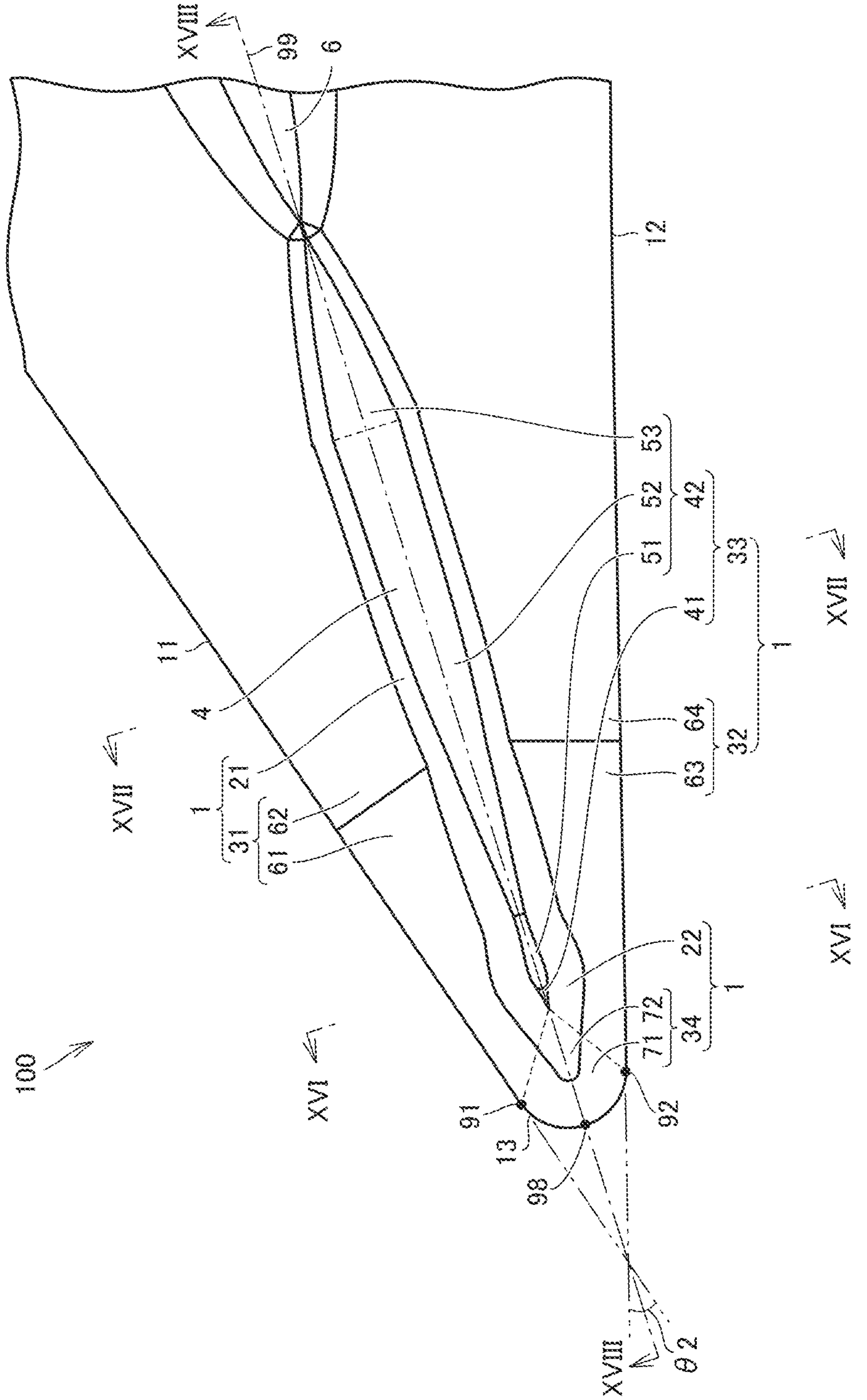
FIG. 15 is an enlarged schematic view showing a region XV in FIG. 14.

FIG. 15 is an enlarged schematic view showing a region XV in FIG. 14. When viewed in first direction 101, the angle (second angle θ2) formed by first cutting edge 11 and second cutting edge 12 is, for example, 35°. Second angle θ2 may be, for example, 30° or more and 40° or less.

Figure 16:
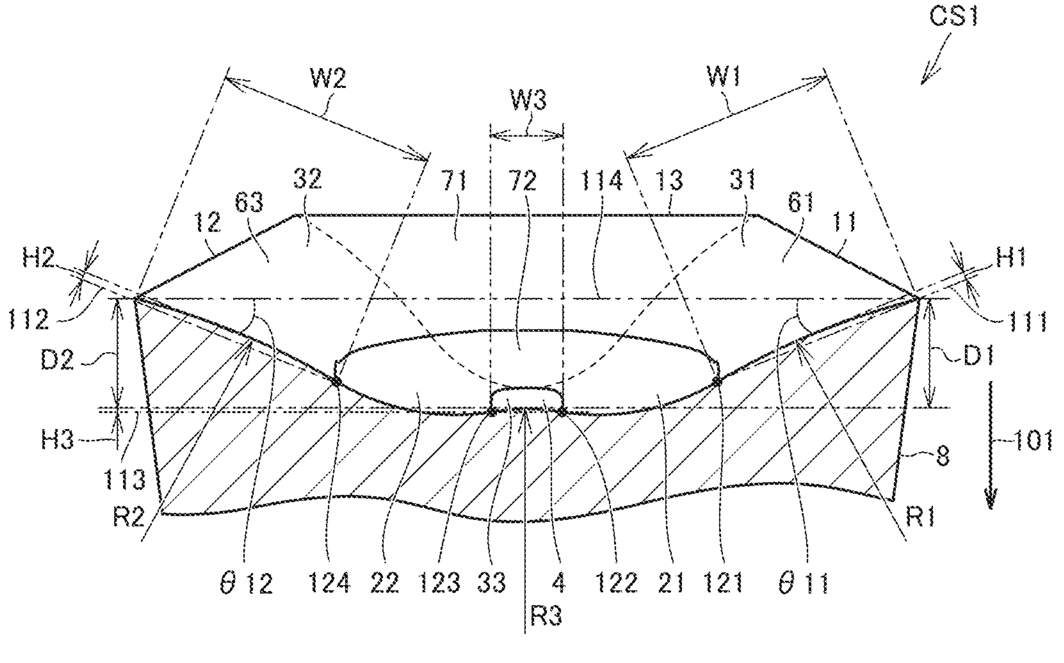
FIG. 16 is a schematic vertical cross-sectional view taken along a line XVI-XVI in FIG. 15.

FIG. 16 is a schematic vertical cross-sectional view taken along a line XVI-XVI in FIG. 15. Third width W3 of protrusion 4 is, for example, 0.05 mm. Third width W3 may be, for example, 0.02 mm or more and 0.08 mm or less. The third ratio of protrusion 4 is, for example, 0.04. The third ratio may be, for example, 0.02 or more and 0.06 or less.

Figure 17:
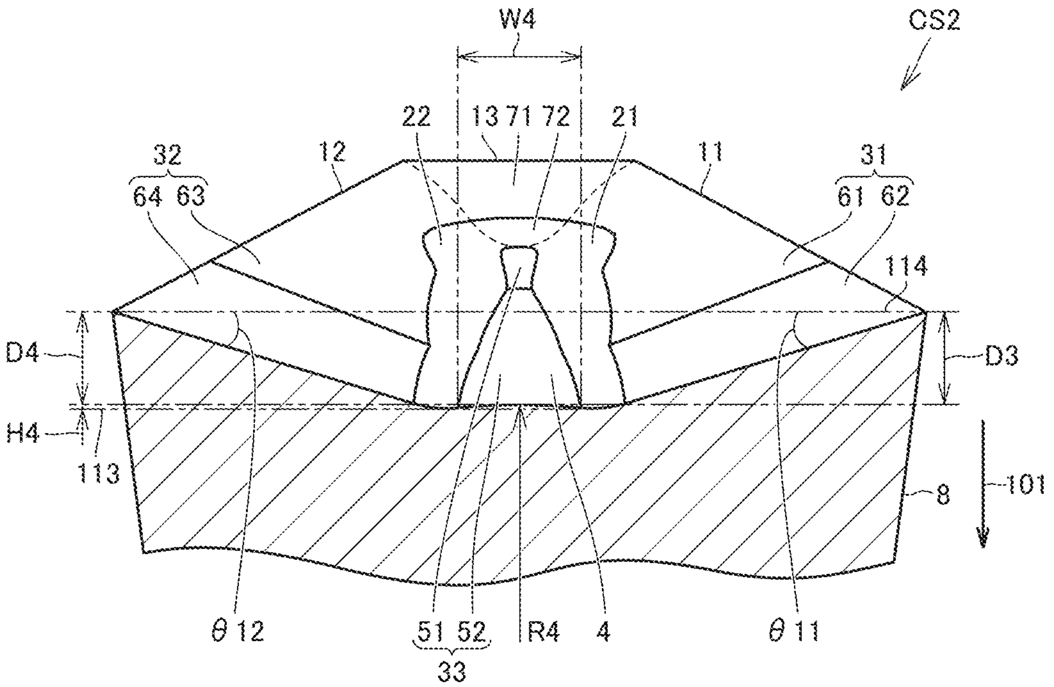
FIG. 17 is a schematic vertical cross-sectional view taken along a line XVII-XVII in FIG. 15.

FIG. 17 is a schematic vertical cross-sectional view taken along a line XVII-XVII in FIG. 15. Fourth width W4 of protrusion 4 is, for example, 0.17 mm. Fourth width W4 may be, for example, 0.10 mm or more and 0.30 mm or less. The ratio of third width W3 to fourth width W4 is, for example, 0.29. The ratio of third width W3 to fourth width W4 may be, for example, 0.1 or more and 0.6 or less. The fourth ratio of protrusion 4 is, for example, 0.02. The fourth ratio may be, for example, 0.01 or more and 0.04 or less.

Figure 18:
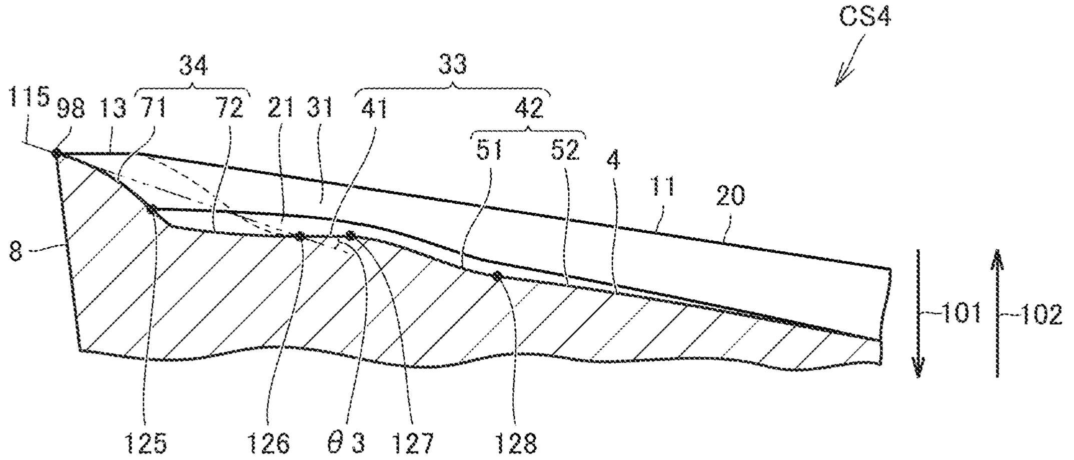
FIG. 18 is a schematic vertical cross-sectional view taken along a line XVIII-XVIII in FIG. 15.

FIG. 18 is a schematic vertical cross-sectional view taken along a line XVIII-XVIII in FIG. 15. In fourth cross section CS4, each of seventh connection point 127 and eighth connection point 128 may be located closer to bottom surface 2 than the boundary between first rake face 31 and first intermediate rake face 21.

The following describes the functions and effects of cutting insert 100 according to the present disclosure.

Figure 19:
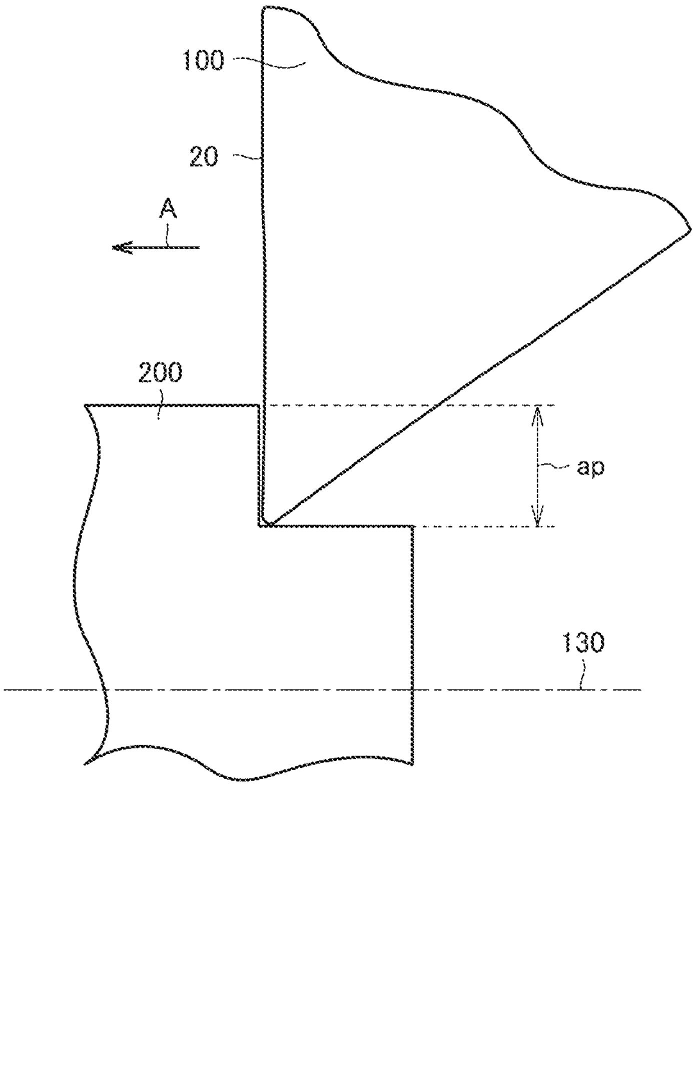
FIG. 19 is a schematic view showing a state in which the cutting insert is used to cut a workpiece.

FIG. 19 is a schematic view showing a state in which cutting insert 100 is used to cut a workpiece 200. As shown in FIG. 19, when cutting insert 100 is used to cut workpiece 200, workpiece 200 is rotated about a rotation axis 130. Cutting insert 100 is attached to a tool body that is not shown. Workpiece 200 is cut by feeding cutting insert 100 in the direction indicated by an arrow A with respect to workpiece 200 that is rotating.

When workpiece 200 is cut, an amount of cut ap is set in accordance with target dimensions of workpiece 200. When a smaller diameter of workpiece 200 is desired, the amount of cut ap is increased. When a larger diameter of workpiece 200 is desired, the amount of cut ap is reduced. Thus, when the diameter of workpiece 200 is changed depending on the portion of workpiece 200 to be cut, the amount of cut ap is changed during processing. As the amount of cut ap is smaller, the width of each chip generated during cutting is smaller. In contrast, as the amount of cut ap is larger, the width of each chip generated during cutting is larger.

In the case of a smaller width of each chip, cutting insert 100 not having protrusion 4 produces chips each having a larger curl diameter, which may deteriorate the chip processability. Specifically, for example, in the case where the amount of cut ap is 0.5 mm or less, the curl diameter of each chip becomes larger, which may deteriorate the chip processability. On the other hand, in the case of a larger width of each chip and also in the case of cutting insert 100 having protrusion 4, this protrusion 4 receives larger force from each chip, so that the cutting resistance increases. Specifically, for example, in the case where the amount of cut ap is 1 mm or more, the cutting resistance increases.

According to cutting insert 100 of the present disclosure, protrusion 4 is provided on top surface 1. In a cross section perpendicular to bisector 99, protrusion 4 has a curved shape protruding outward. The ratio (the fourth ratio) of the height (fourth height H4) of protrusion 4 to the width (fourth width W4) of protrusion 4 in second cross section CS2 is smaller than the ratio (the third ratio) of the height (third height H3) of protrusion 4 to the width (third width W3) of protrusion 4 in first cross section CS1. Third distance D3 is longer than first distance D1. Fourth distance D4 is longer than second distance D2. Thereby, in the case of a smaller amount of cut ap, the distance between the cutting edge and protrusion 4 in first direction 101 is small and protrusion 4 protrudes significantly outward, so that the chips can be pushed back effectively by protrusion 4. On the other hand, in the case of a larger amount of cut ap, the distance between the cutting edge and protrusion 4 in first direction 101 is large and protrusion 4 does not significantly protrude, so that the chips can flow without being pushed back by protrusion 4. This consequently makes it possible to improve the chip processability in the case of a smaller amount of cut ap and also possible to reduce the cutting resistance in the case of a larger amount of cut ap.

According to cutting insert 100 of the present disclosure, the ratio of the height of first rake face 31 to the width of first rake face 31 in second cross section CS2 is smaller than the ratio (the first ratio) of the height (first height H1) of first rake face 31 to the width (first width W1) of first rake face 31 in first cross section CS1. The ratio of the height of second rake face 32 to the width of second rake face 32 in second cross section CS2 is smaller than the ratio (the second ratio) of the height (second height H2) of second rake face 32 to the width (second width W2) of second rake face 32 in first cross section CS1. Thereby, in the case of a smaller amount of cut ap, each of first rake face 31 and second rake face 32 protrudes significantly outward, to thereby increase the amount of chips that are drawn in the direction from top surface 1 toward bottom surface 2. Therefore, after a large amount of chips has been drawn, the chips can be pushed back by protrusion 4, which enables a smaller curl diameter of each chip. On the other hand, a larger amount of cut ap enables a larger wedge angle of the cutting edge in the cross section perpendicular to bisector 99. This consequently makes it possible to improve the chip processability in the case of a smaller amount of cut ap and also possible to enhance the strength of the cutting edge in the case of a larger amount of cut ap.

According to cutting insert 100 of the present disclosure, each of first rake face 31 and second rake face 32 has a curved shape protruding outward in first cross section CS1. In first cross section CS1, the rake angle (first rake angle θ11) of first rake face 31 is larger in a direction closer to protrusion 4 from first cutting edge 11. In first cross section CS1, the rake angle (second rake angle θ12) of second rake face 32 is larger in a direction closer to protrusion 4 from second cutting edge 12. Thus, a smaller amount of cut ap makes it possible to further increase the amount of chips that are drawn in the direction from top surface 1 toward bottom surface 2. This makes it possible to more effectively improve the chip processability in the case of a smaller amount of cut ap.

According to cutting insert 100 of the present disclosure, in second cross section CS2, each of first rake face 31 and second rake face 32 is straight in shape. Therefore, the strength of the cutting edge in the case of a larger amount of cut ap can be more effectively enhanced as compared with the case where each of first rake face 31 and second rake face 32 has a curved shape.

According to cutting insert 100 of the present disclosure, in a cross section (fourth cross section CS4) parallel to first direction 101 and including bisector 99, first surface 41 is inclined with respect to corner rake face 34 in the direction from bottom surface 2 to top surface 1. In the case where the amount of cut ap is equal to or smaller than the radius of curvature of corner cutting edge 13, the chips may flow along bisector 99. In this case, according to cutting insert 100 of the present disclosure, the chips drawn along corner rake face 34 can be pushed back by first surface 41. Thereby, the chip processability can be improved.

According to cutting insert 100 of the present disclosure, second surface 42 is located closer to bottom surface 2 than first surface 41 in the cross section (fourth cross section CS4) parallel to first direction 101 and including bisector 99. Thus, in the case of a larger amount of cut ap, the force with which second surface 42 pushes back the chips can be reduced. This makes it possible to more effectively reduce the cutting resistance in the case of a larger amount of cut ap.

It should be understood that the embodiments disclosed herein are illustrative and non-restrictive in every respect. The scope of the present invention is defined by the terms of the claims, rather than the embodiments described above, and is intended to include any modifications within the meaning and scope equivalent to the terms of the claims.

REFERENCE SIGNS LIST

1 top surface, 2 bottom surface, 4 protrusion, 5 flat surface, 6 upward slope surface, 7 inner peripheral surface, 8 outer peripheral surface, 9 through hole, 10 cutting edge portion, 11 first cutting edge, 12 second cutting edge, 13 corner cutting edge, 14 first straight portion, 15 second straight portion, 20 ridgeline, 21 first intermediate rake face, 22 second intermediate rake face, 31 first rake face, 32 second rake face, 33 third rake face, 34 corner rake face, 41 first surface, 42 second surface, 51 first portion, 52 second portion, 53 third portion, 61 first rake portion, 62 second rake portion, 63 third rake portion, 64 fourth rake portion, 71 first corner rake portion, 72 second corner rake portion, 91 first end portion, 92 second end portion, 98 reference point, 99 bisector, 100 cutting insert, 101 first direction, 102 second direction, 111 first imaginary straight line, 112 second imaginary straight line, 113 third imaginary straight line, 114 fourth imaginary straight line, 115 fifth imaginary straight line, 121 first connection point, 122 second connection point, 123 third connection point, 124 fourth connection point, 125 fifth connection point, 126 sixth connection point, 127 seventh connection point, 128 eighth connection point, 130 rotation axis, 200 workpiece, A arrow, CS1 first cross section, CS2 second cross section, CS3 third cross section, CS4 fourth cross section, D1 first distance, D2 second distance, D3 third distance, D4 fourth distance, H1 first height, H2 second height, H3 third height, H4 fourth height, O center, R1 first radius of curvature, R2 second radius of curvature, R3 third radius of curvature, R4 fourth radius of curvature, W1 first width, W2 second width, W3 third width, W4 fourth width, ap amount of cut, θ1 first angle, θ2 second angle, θ3 third angle, θ11 first rake angle, θ12 second rake angle.

The invention claimed is:

1. A cutting insert comprising:

a top surface;

a bottom surface located opposite to the top surface; and an outer peripheral surface contiguous to each of the top surface and the bottom surface, wherein a ridgeline between the top surface and the outer peripheral surface includes a first cutting edge, a corner cutting edge contiguous to the first cutting edge, and a second cutting edge contiguous to the corner cutting edge and located opposite to the first cutting edge with respect to the corner cutting edge, a protrusion is provided on the top surface, when viewed in a first direction extending from the top surface to the bottom surface and perpendicular to the bottom surface, the protrusion extends along a bisector of an angle formed by the first cutting edge and the second cutting edge, in a cross section perpendicular to the bisector, the protrusion has a curved shape protruding outward, in the first direction, the protrusion is located closer to the bottom surface than each of the first cutting edge and the second cutting edge, when viewed in the first direction, a point of intersection of the corner cutting edge and the bisector is defined as a reference point, in a first cross section located at a distance of 0.5 mm from the reference point and perpendicular to the bisector, a distance between the first cutting edge and the protrusion in the first direction is defined as a first distance, and a distance between the second cutting edge and the protrusion in the first direction is defined as a second distance, in a second cross section located at a distance of 1.5 mm from the reference point and perpendicular to the bisector, a distance between the first cutting edge and the protrusion in the first direction is defined as a third distance, and a distance between the second cutting edge and the protrusion in the first direction is defined as a fourth distance, the third distance is longer than the first distance, the fourth distance is longer than the second distance, and a ratio of a height of the protrusion to a width of the protrusion in the second cross section is smaller than a ratio of a height of the protrusion to a width of the protrusion in the first cross section.

2. The cutting insert according to claim 1, wherein the top surface includes a first rake face contiguous to the first cutting edge and located between the first cutting edge and the protrusion, and a second rake face contiguous to the second cutting edge and located between the second cutting edge and the protrusion, a ratio of a height of the first rake face to a width of the first rake face in the second cross section is smaller than a ratio of a height of the first rake face to a width of the first rake face in the first cross section, a ratio of a height of the second rake face to a width of the second rake face in the second cross section is smaller than a ratio of a height of the second rake face to a width of the second rake face in the first cross section, and in the first cross section, each of the first rake face and the second rake face has a curved shape protruding outward, a rake angle of the first rake face is larger in a direction closer to the protrusion from the first cutting edge, and a rake angle of the second rake face is larger in a direction closer to the protrusion from the second cutting edge.

3. The cutting insert according to claim 2, wherein, in the second cross section, each of the first rake face and the second rake face is straight in shape.

4. The cutting insert according to claim 2, wherein the top surface further includes a third rake face located between the first rake face and the second rake face, the third rake face being formed by the protrusion, and a corner rake face located between the third rake face and the corner cutting edge, the third rake face includes a first surface located opposite to the corner cutting edge with respect to the corner rake face, and a second surface contiguous to the first surface and located opposite to the corner rake face with respect to the first surface, and in a cross section parallel to the first direction and including the bisector, the first surface is inclined with respect to the corner rake face in a second direction extending from the bottom surface to the top surface, and the second surface is located closer to the bottom surface than the first surface.

* * * * *